United States Patent
Tseng et al.

(10) Patent No.: US 11,178,565 B2
(45) Date of Patent: Nov. 16, 2021

(54) SIDELINK MEASUREMENT REPORTING IN NEXT GENERATION WIRELESS NETWORKS

(71) Applicant: FG Innovation Company Limited, Tuen Mun (CN)

(72) Inventors: Yung-Lan Tseng, Hsinchu (TW); Yu-Hsin Cheng, Hsinchu (TW); Mei-Ju Shih, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/672,111

(22) Filed: Nov. 1, 2019

(65) Prior Publication Data

US 2020/0145867 A1    May 7, 2020

Related U.S. Application Data

(60) Provisional application No. 62/754,716, filed on Nov. 2, 2018.

(51) Int. Cl.
| | |
|---|---|
| *H04W 24/10* | (2009.01) |
| *H04W 28/02* | (2009.01) |
| *H04W 76/14* | (2018.01) |
| *H04W 88/02* | (2009.01) |

(52) U.S. Cl.
CPC .......... *H04W 24/10* (2013.01); *H04W 76/14* (2018.02); *H04W 28/0284* (2013.01); *H04W 28/0289* (2013.01); *H04W 88/02* (2013.01)

(58) Field of Classification Search
CPC ....... H04W 4/46; H04W 24/10; H04W 36/30; H04W 52/242; H04W 76/14; H04W 28/0284; H04W 28/0289
See application file for complete search history.

(56) References Cited

U.S. PATENT DOCUMENTS

| | | | |
|---|---|---|---|
| 2018/0139706 A1* | 5/2018 | Li ...................... | H04W 52/242 |
| 2018/0213379 A1 | 7/2018 | Xiong et al. | |
| 2018/0227821 A1* | 8/2018 | Tsai ..................... | H04W 36/30 |
| 2018/0234973 A1 | 8/2018 | Lee et al. | |
| 2018/0302873 A1* | 10/2018 | Kazmi ................. | H04W 24/10 |
| 2018/0317077 A1 | 11/2018 | Kim et al. | |
| 2019/0037430 A1* | 1/2019 | Lee ....................... | H04W 4/46 |
| 2019/0274121 A1* | 9/2019 | Wu ....................... | H04L 5/0053 |
| 2019/0373618 A1* | 12/2019 | Medina ................ | H04W 76/14 |
| 2020/0128470 A1* | 4/2020 | Mok ..................... | H04W 40/14 |

FOREIGN PATENT DOCUMENTS

| | | |
|---|---|---|
| WO | 2017192006 A2 | 11/2017 |
| WO | 2018143786 A1 | 8/2018 |

\* cited by examiner

*Primary Examiner* — Benjamin H Elliott, IV
*Assistant Examiner* — Prince A Mensah
(74) *Attorney, Agent, or Firm* — ScienBiziP, P.C.

(57) ABSTRACT

Some of the present implementations provide a method for a first user equipment (UE) to deliver a sidelink measurement report to a second UE. The method generates the sidelink measurement report by monitoring at least one resource pool allocated to the first UE. The method then transmits the generated sidelink measurement report to the second UE through a PC5 interface between the first and second UEs. As such, the second UE may adjust one or more sidelink transmission parameters of the second UE based on the sidelink measurement report received form the first UE.

20 Claims, 12 Drawing Sheets

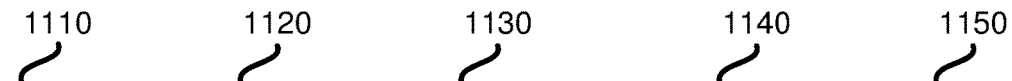

| SL-CBR ($C_{SL}$) Range | SL-Tx Power Parameters (Per Slot) | SL-Range of the Number of Retransmissions Per TB | SL-Modulation and Coding Scheme | SL-Maximum Limit on CR Ratio |
|---|---|---|---|---|
| $0 \leq C_{SL} < T_{CBR\_a}$ | $\{P_{0\_PSSCH,1}, alpha_{PSSCH,1}\}$ | 4 | $MCS_{SL}\#1 \sim MCS_{SL}\#5$ | $CR_{SL,1}$ |
| $T_{CBR\_a} \leq C_{SL} < T_{CBR\_b}$ | $\{P_{0\_PSSCH,2}, alpha_{PSSCH,2}\}$ | 4 | $MCS_{SL}\#1 \sim MCS_{SL}\#4$ | $CR_{SL,2}$ |
| $T_{CBR\_b} \leq C_{SL} < T_{CBR\_c}$ | $\{P_{0\_PSSCH,3}, alpha_{PSSCH,3}\}$ | 2 | $MCS_{SL}\#1 \sim MCS_{SL}\#3$ | $CR_{SL,3}$ |
| $T_{CBR\_b} \leq C_{SL} \leq 1$ | $\{P_{0\_PSSCH,4}, alpha_{PSSCH,4}\}$ | 2 | $MCS_{SL}\#1 \sim MCS_{SL}\#2$ | $CR_{SL,4}$ |

FIG. 11

SIDELINK MEASUREMENT REPORTING IN NEXT GENERATION WIRELESS NETWORKS

CROSS-REFERENCE TO RELATED APPLICATION(S)

The present application claims the benefit of and priority to a provisional U.S. Patent Application Ser. No. 62/754,716, filed on Nov. 2, 2018, entitled "Sidelink Measurement Report Design for Group-based Sidelink," (hereinafter referred to as "US75392 application"). The disclosure of the US75392 application is hereby incorporated fully by reference into the present application.

FIELD

The present disclosure generally relates to wireless communications, and more particularly, to reporting sidelink measurements in the next generation wireless networks.

BACKGROUND

In New Radio (NR), a UE may exchange sidelink data (e.g., user data and control signaling) with other UEs directly and without the help (e.g., relaying) of a base station. A UE may exchange sidelink packets with other UEs through a configured interface (e.g., a PC5 interface). During the packet exchange, the UE may perform sidelink (SL) measurement(s) and adjust its sidelink transmission parameters (SL-TxParameters) based on the sidelink measurement (SL-measurement) results. Such measurement results, however, may not accurately reflect the network traffic congestion. For example, even for the same sidelink resource pool(s), the SL-measurement results for a transmitter (Tx) UE may be different than the SL-measurement results for a receiver (Rx) UE. As such, when there is a considerable gap between the congestion levels on the Tx and Rx UEs' sides, the Quality of Service (QoS) for SL-packet deliveries may be substantially impacted.

Another shortcoming of each UE relying only on its own SL-measurement results is related to power consumption. That is, for a UE that has a power limitation, each SL-measurement process performed by the UE may become a considerable burden. Additionally, some UEs may not support, or may partially support, the SL-measurement functions.

SUMMARY

The present disclosure is directed to reporting sidelink measurements in the next generation wireless networks.

In a first aspect of the present application, a method for a first UE to deliver a sidelink measurement report to a second UE is provided. The method comprises generating the sidelink measurement report by monitoring at least one target resource pool allocated to the first UE; and transmitting the sidelink measurement report to the second UE through a PC5 interface between the first and second UEs, wherein the at least one target resource pool is associated with a first radio access technology (RAT) and the PC5 interface is associated with a second RAT.

In an implementation of the first aspect, each one of the first and second RATs is one of a new radio (NR) and a long term evolution (LTE).

In another implementation of the first aspect, transmitting the sidelink measurement report comprises transmitting the sidelink measurement report for the second UE to adjust one or more sidelink transmission parameters of the second UE based on the sidelink measurement report.

Another implementation of the first aspect further comprises receiving, through the PC5 interface, a measurement report transmission configuration from the second UE, wherein transmitting the sidelink measurement report comprises transmitting the sidelink measurement report to the second UE based on the measurement report transmission configuration received from the second UE.

Another implementation of the first aspect further comprises before transmitting the sidelink measurement report, receiving a triggering event that indicates to the first UE to transmit the sidelink measurement report to the second UE.

In another implementation of the first aspect, the triggering event comprises at least one of: the second UE not having available sidelink measurement result(s) yet for at least one of target resource pools allocated to the first UE; the second UE requesting the first UE for the sidelink measurement report; a measurement result being one of higher than a first threshold and lower than a second threshold; and a predefined time interval being lapsed.

In another implementation of the first aspect, the sidelink measurement report is a first sidelink measurement report, the method further comprising: receiving, from the second UE, a second sidelink measurement report; and adjusting sidelink transmission parameters of the first UE based on the first and second sidelink measurement reports.

In another implementation of the first aspect, the first UE is a group leader of a sidelink group comprising the first UE, the second UE, and a third UE, and wherein the sidelink measurement report is a first sidelink measurement report, the method further comprising: receiving, from the second UE, a second sidelink measurement report; receiving, from the third UE, a third sidelink measurement report; adjusting sidelink transmission parameters for the sidelink group based on the first, second, and third sidelink measurement reports.

In another implementation of the first aspect, the sidelink measurement report comprises at least one of a channel busy ratio (CBR) and a channel occupancy ratio (CR) measurement associated with the at least one resource pool.

In a second aspect of the present application, a first UE comprising one or more non-transitory computer-readable media having computer-executable instructions for delivering a sidelink measurement report to a second UE, and at least one processor coupled to the one or more non-transitory computer-readable media is provided. The at least one processor is configured to execute the computer-executable instructions to generate the sidelink measurement report by monitoring at least one target resource pool allocated to the first UE; and transmit the sidelink measurement report to the second UE through a PC5 interface between the first and second UEs, wherein the at least one target resource pool is associated with a first radio access technology (RAT) and the PC5 interface is associated with a second RAT.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

FIG. 11 is an example mapping table illustrating mapping of the monitored (or received) CBR values to the associated SL-TxParameters, according to one example implementation of the present application.

DETAILED DESCRIPTION

Figure 1:
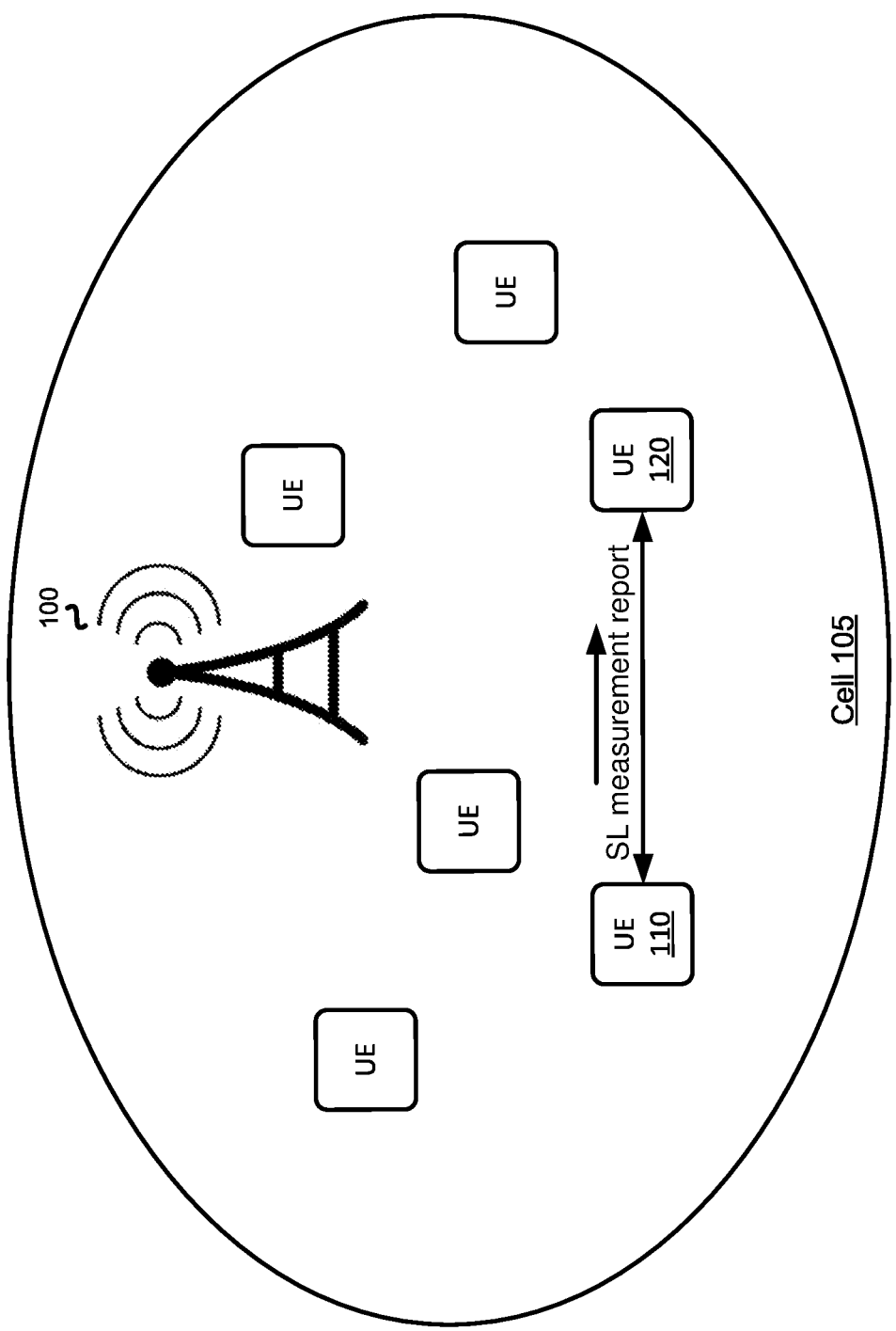
FIG. 1 is a diagram illustrating a UE delivering a sidelink measurement report to another UE in a coverage area of a cell, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station may communicate with one or more UEs in the radio communication system through the plurality of cells. A cell may allocate sidelink (SL) resources for supporting Proximity Service (ProSe) or Vehicle to Everything (V2X) services. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each cell group may be formed by one of these nodes and may include one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell (Primary Secondary Cell) and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCell (PSCell) may be an SCG cell in which the UE performs random access (e.g., when performing the reconfiguration with a sync procedure) for air link connections with SCG. In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and (contention-based) Random Access procedure, and may always be activated. Additionally, a UE in an RRC_CONNECTED state, that is not configured with the CA/DC, may communicate with only one serving cell which may be the primary cell. Conversely, for a UE in the RRC_CONNECTED state that is configured with the CA/DC a set of serving cells including the special cell(s) and secondary cells may communicate with the UE.

As described above, the measurement results (e.g., the channel busy ratio (CBR)) for a transmitter (Tx) UE and a receiver UE may be considerably different, which may impact the network traffic congestion. In some of the present implementations, a first UE (e.g., a Tx UE) may receive a sidelink measurement report from a second UE (e.g., an Rx UE that is in the same SL-group as the first UE) through a PC5 interface. In some of such implementations, the first UE may then adjust its transmission parameters (e.g., maximum transmission power, range of the number of retransmissions per transport block (TB), etc.) based on the received SL-measurement report (e.g., the CBR report received from the second UE) and the first UE's own measurement results (e.g., the CBR measured at the first UE's side). In some of the present implementations, the measurement results rendered at the first UE and the measurement results received from the second UE may be associated with the same resource pool(s) the first and second UEs use to exchange the sidelink packets.

Additionally, for a set of UEs that are in the same sidelink group (and within a short distance from each other), the measurement results (e.g., the CBRs observed by the UEs) may be the same, or substantially similar. As such, not all of the UEs may need to perform the measurements, for example, on the same SL resource pool(s). In some of the present implementations, one specific UE (e.g., a local manager or a Sidelink group leader) in an SL-group may be responsible to adjust the transmission parameters for every UE in the SL-group (e.g., for the group case services). A sidelink group may be determined by the members of the group and/or by the higher layer(s). For example, in an out of coverage scenario (or a partial (in-coverage) scenario), some UEs in an SL-group may be in-coverage and other UEs in the SL-group may be out-of-coverage. As such, an out-of-coverage UE may still be able to communicate with the RAN through the assistance of one or more in-coverage UEs in the SL-group.

In some of the present implementations, two UEs may discover each other and negotiate (e.g., through the application layer) establishing an SL-group. In some of the present implementations, the grouping may be achieved through the network (e.g., by a server and through the Access Stratum (AS) layer). In some aspects of the present implementation, a serving cell may contribute in grouping the UEs to exchange sidelink data. In addition, within the grouping procedure, (at least) one SL-group leader (which may also be called a local manager) may be configured among the members of the SL-group. In some other embodiments, one local manager may manage more than one SL-group (e.g., in the PC5 interface). The SL-group may exchange sidelink packets through one or more frequency carriers, which may be referred to as sidelink component carrier (SL-CC) in the present application.

In some aspects of the present implementations, the local manager may use its own measurement results to adjust the transmission parameters of (at least) one SL-group. In some other aspects of the present implementations, the local manager may receive SL-measurement report(s) from one or more other UEs in the group (e.g., through the PC5 interface) and adjust the transmission parameters for the group based on its own measurement results and the received SL-measurement report(s).

In some of the present implementations, the local manager may receive the SL-measurement reports (e.g., to update the transmission parameters of the SL-group) from one or more other UEs in the group upon the occurrence of one or more triggering events. The triggering events, in some of the present implementations, may include, but are not limited to, a new UE joining the SL-group, the local manager requesting for the SL-measurement report, a measurement result including a value (e.g., a CBR value) being higher/lower than a specific (e.g., predefined) threshold, periodically (e.g., at specific time intervals), etc.

The CBR measurement may be used in an LTE/NR V2X service for managing a Quality of Service (QoS) of the V2X service. When a UE transmits the sidelink packets on one or more sidelink resource (SL-resource) pools, the UE may need to measure the CBR of the corresponding (target) SL-resource pools in one (or more than one) sidelink component carrier. To measure the SL-resource pools, the UE may monitor a Physical Sidelink Control Channel (PSCCH) and/or a Physical Sidelink Shared Channel (PSSCH) on (at least) one sidelink component carrier during a specific (e.g., predefined) time period. The CBR measured in a subframe n, as shown in Table 1 below, may be calculated based on a threshold identified by monitoring a time period (e.g., the last subframes [n-100, n-1]) in one or more sidelink component carriers.

TABLE 1

| | |
|---|---|
| Definition | Channel busy ratio (CBR) in NR/LTE PC5 interface measured in (NR/LTE) subframe n in one sidelink component carrier is defined as follows: For PSSCH, the portion of sub-channels in the resource pool whose Sidelink Received Signal Strength Indicator (S-RSSI) measured by the UE exceeds a (pre)configured threshold sensed over a time period (e.g., subframes [n − 100, n − 1]); For PSCCH/PSSCH, in a pool (pre)configured such that PSCCH may be transmitted with its corresponding PSSCH in non-adjacent resource blocks, the portion of the resources of the PSCCH pool whose S-RSSI (Sidelink Received Signal Strength Indicator) measured by the UE exceed a (pre)configured threshold sensed over a time period (e.g., subframes [n − 100, n − 1]), assuming that the PSCCH pool includes resources with a size of two consecutive Physical Resource Block (PRB) pairs in the frequency domain. |
| Applicable for | (NR/LTE) RRC_IDLE intra-frequency, (NR/LTE) RRC_IDLE inter-frequency, (NR/LTE) RRC_CONNECTED intra-frequency, (NR/LTE) RRC_CONNECTEDinter-frequency (NR/LTE) RRC_Inactive intra-frequency (NR/LTE) RRC_Inactive inter-frequency |

NOTE:
The subframe index is based on physical subframe index

A UE configured for the sidelink packet transmission may be configured to dynamically (or semi-persistently) monitor the CBR results. That is, the UE may not need to report the CBR results to a serving cell (or base station) and may adjust the UEs transmission parameters without the help of a serving cell. Conversely, a UE (a Tx UE and/or an Rx UE) may also be configured by a serving cell to report the CBR measurement results to the serving cell.

Based on the CBR result, the UE may perform an SL-TxParameters adaptation (i.e., may adjust one or more sidelink transmission parameters) during a sidelink packet exchange. A UE may perform a transmission parameter adaptation based on the CBR regardless of the UE's RRC state (e.g., RRC Connected state, RRC Inactive state, or RRC Idle state) in the Uu interface. As described above, in case the PSSCH and PSCCH resources are placed non-adjacently, only the PSSCH pool measurement may be used for a transmission parameter adaptation. In case the PSSCH and PSCCH resources are placed adjacently, the CBR measurement of both of the PSSCH and PSCCH resources may be used for the transmission parameter adaptation. When the CBR measurements are not available, the default sidelink transmission parameters may be used.

The transmission parameters (SL-TxParameters) may include, but are not limit to, a maximum transmission power, range of a number of retransmissions per TB, range of a PSSCH RB number, range of a Modulation and Coding Scheme (MCS), a maximum limit on channel occupancy ratio, etc. It should be noted that the SL-TxParameters adaptation may be applied to all available SL-transmission pools, including the exceptional pools (defined below), of a UE or a sidelink group (SL-Group). Additionally, in some of the present implementations, the SL-TxParameters adaptation may be applied to a subset of the SL-transmission pools of a UE or a sidelink group (SL-Group). In some of the present implementations for (at least) one UE or (at least) one SL-group, the SL-TxParameters of LTE PC5 interface and SL-TxParameters of NR PC5 interface may be adjusted independently, for example, based on the SL-measurement of the LTE SL Pools and NR SL Pools, respectively.

In some scenarios (also referred to as Exceptional Conditions), a UE may not be allowed to apply the configured SL radio resources. The network (RAN) may (pre)configure 'Exceptional SL Pools' to the UEs, e.g., through dedicated RRC signaling, such as RRCConnection(Re)Establishment message, RRCConnectionRelease message with/without suspend configuration, RRCConnectionReconfiguration message with/without mobilitycontrolinfoV2X, or RRCConnectionReconfiguration message with/without reconfigurationwithsync message. The UEs may be allowed to transmit/receive SL packets on Exceptional SL resource pools (or exceptional pools) only when at least one of the Exceptional Conditions has occurred. In other words, when a UE determines that an exceptional condition (e.g., a sidelink radio link failure, a sidelink beam failure, sidelink Layer-2 RLC (Radio Link Control) packet transmission reaches to a pre-defined maximum value, etc.) has occurred, the UE may apply the Exceptional SL Pools directly (e.g., use the Exceptional SL Pools resources preconfigured to the UE) to maintain the continuity of the SL communications (e.g., the V2X services).

A serving base station may configure a UE (e.g., an RRC Connected UE) to report the UE's CBR measurement results to the base station. Additionally, the serving base station may further configure the target resource pools associated with the CBR report. The CBR report may be a periodical event or event-triggered (i.e., triggered based on an event). Two reporting events are introduced for event-triggered CBR reporting for LTE/NR V2X service. Event-triggered CBR reporting for LTE/NR V2X service, as described in Table 2 and Table 3 below, may be triggered by an over-loaded threshold and/or a less-loaded threshold. The network may specify (e.g., through configuration) the transmission pools that the UE needs to report.

TABLE 2

Event V1 (The channel busy ratio is above a threshold)
The UE may:
1> consider the entering condition for this event to be satisfied when condition V1-1, as specified below, is fulfilled;
1> consider the leaving condition for this event to be satisfied when condition V1-2, as specified below, is fulfilled;
Inequality V1-1 (Entering condition)
$Ms - Hys > Thresh$
Inequality V1-2 (Leaving condition)
$Ms + Hys < Thresh$ The variables in the formula are defined as follows:

Ms is the measurement result of channel busy ratio of the transmission resource pool, may not taking into account any offsets.
Hys is the hysteresis parameter for this event (i.e. hysteresis as defined within ReportConfigEUTRA (for LTE/NR PC5 interface) or ReportConfigNR (for NR/LTE PC5 interface) for this event).
Thresh is the threshold parameter for this event (i.e. v1-Threshold as defined within ReportConfigEUTRA (for LTE/NR PC5 interface) or ReportConfigNR (for NR/LTE PC interface))
Ms is expressed in decimal from 0 to 1 in steps of 0.01.
Hys is expressed is in the same unit as Ms.
Thresh is expressed in the same unit as Ms.

TABLE 3

Event V2 (The channel busy ratio is below a threshold)
The UE may:
1> consider the entering condition for this event to be satisfied when condition V2-1, as specified below, is fulfilled;
1> consider the leaving condition for this event to be satisfied when condition V2-2, as specified below, is fulfilled;
Inequality V2-1 (Entering condition)
$Ms + Hys < Thresh$
Inequality V2-2 (Leaving condition)
$Ms - Hys > Thresh$ The variables in the formula are defined as follows:

Ms is the measurement result of channel busy ratio of the transmission resource pool, may not taking into account any offsets.
Hys is the hysteresis parameter for this event (i.e. hysteresis as defined within ReportConfigEUTRA (for LTE/NR PC5 interface) or ReportConfigNR (for NR/LTE PC5 interface) for this event).
Thresh is the threshold parameter for this event (i.e. v2-Threshold as defined within ReportConfigEUTRA (for LTE/NR PC5 interface) or ReportConfigNR (for NR/LTE PC5 interface)).
Ms is expressed in decimal from 0 to 1 in steps of 0.01.
Hys is expressed is in the same unit as Ms.
Thresh is expressed in the same unit as Ms.

In addition, for the channel occupancy ratio (CR), as shown in Table 4 below, the CR evaluated at subframe n may be the total number of sub-channels used for its transmission in a time period (e.g., subframes [n–a, n–1] and granted in subframes [n, n+b] by the total number of configured sub-channels in the transmission pool over [n–a, n+b]).

TABLE 4

| | |
|---|---|
| Definition | Channel occupancy ratio (CR) in NR/LTE PC5 interface evaluated at (NR/LTE) subframe n is defined as the total number of sub-channels used for its transmissions in a time period (e.g., subframes [n − a, n − 1] and granted in subframes [n, n + b] divided by the total number of configured sub-channels in the transmission pool over [n − a, n + b]). |
| Applicable for | (NR/LTE) RRC_IDLE intra-frequency, <br> (NR/LTE) RRC_IDLE inter-frequency, <br> (NR/LTE) RRC_CONNECTED intra-frequency, <br> (NR/LTE) RRC_CONNECTED inter-frequency <br> (NR/LTE) RRC_Inactive intra-frequency <br> (NR/LTE) RRC_Inactive intra-frequency |

NOTE 1:
a may be a positive integer and b may be 0 or a positive integer; a and b may be determined by UE implementation with a + b + 1 = 1000, a >= 500, and n + b may not exceed the last transmission opportunity of the grant for the current transmission.
NOTE 2:
CR is evaluated for each (re)transmission.
NOTE 3:
In evaluating CR, the UE may assume the transmission parameter used at subframe n is reused according to the existing grant(s) in subframes [n + 1, n + b] without packet dropping.
NOTE 4:
The subframe index is based on physical subframe index.
NOTE 5:
CR can be computed per priority level.

In some of the present embodiments, a UE (e.g., a V2X UE) may deliver the UE's SL-measurement report (e.g., a CBR report, a CR report, S-RSSI, S-RSRP (Sidelink Reference Signal Received Power), S-RSRQ (Sidelink Reference Signal Received Quality), etc.) to other (V2X) UEs using the UE's PC5 interface (e.g., through PC5 RRC message). In some of such implementations, a UE may be a Tx UE and/or an Rx UE (e.g., by configuration) to transmit and/or receive sidelink packets. Therefore, each UE (or only a subset of the UEs) may need to perform the SL-measurements. In some aspects of the present implementations, the UE may be configured by a serving cell to perform the SL-measurements. In some other aspects of the present implementations, the UE may be configured by other UEs (e.g., by a local manager in an SL-Group) to perform the SL-measurements (e.g., irrespective of the UE being a Tx/Rx UE in the sidelink packet exchange). In yet, some other aspects of the present implementations, the UE may be preconfigured to perform the SL-measurements, for example, based on the configuration stored at the UE.

In some of the present implementations, different triggering events may trigger the UEs to deliver the SL-measurement reports. The triggering events may include, but are not limited to, when a sidelink packet delivery is initialized, when the SL-measurement result is higher/lower than a threshold, upon the UE's request, and via a local manager assistance. Each of the aforementioned triggering events will be described in more detail below. In some of the present implementations, a UE may deliver the SL-measurement report through a unicast approach in PC5 interface, while in some other aspects of the present implementations, the SL-measurement report delivery may be of a group-cast type in PC5 interface.

As described above, if the SL-measurement results between a set of UEs (e.g., the UEs within an SL-Group) are the same, or similar, then not all of the UEs need to perform the SL-measurements (e.g., in order to save overhead by the whole SL-Group). In some of the present implementations, a specific UE (e.g., the local manager of an SL-Group) may take the responsibility of performing the SL-measurements and delivering the SL-measurement results to the other UEs in the SL-Group. Additionally, in some of such implementations, the UEs that are not capable of performing the measurements, such as evaluating a CBR, may adapt (or adjust) their transmission parameters (SL-TxParameters) based on the SL-measurement results received from a neighbor UE (e.g., the local manager).

In some of the present implementations, the local manager may deliver the SL-measurement results to another UE (or other UEs) in the SL-group only while the distance between the other UE(s) and the local manager is shorter than a predefined threshold distance (e.g., a predefined threshold $X_{SL-meas}$ (meters) may have been preconfigured for the SL-group). As such, the local manager may deliver the SL-measurement results to one or more target UEs while the distance(s) between the local manager and the target UE(s) is shorter than $X_{SL-meas}$. Conversely, in some of the present implementations, the local manager (or group leader) may not deliver the SL-measurement results to one or more UEs in the SL-group while the distance(s) between the local manager and the concerned UE(s) is larger than the predefined threshold distance. In some of the present implementations, a UE may estimate the physical distance to another UE by receiving the positioning information transmitted by the other UE (e.g., by receiving Sidelink Control Information (SCI) transmitted by the other UE). The transmitted SCI may include a zone area ID (e.g., by following the zone configuration in the LTE V2X protocols or GNSS (Global Navigation Satellite System) positioning information of the UE).

Furthermore, if the SL-measurement results (e.g., CBR) between the UEs are quite different, the SL-measurement reports prepared by a first UE (e.g., an Rx UE) may help a second UE (e.g., a Tx UE) to adjust the SL-TxParameters in a more robust way in some of the present implementations. Moreover, in some of the present implementations, for a group of UEs that are capable of performing the SL-measurements, the UEs may detect the measurement conditions (e.g., whether the CBRs obtained by the UEs are similar to each other, or different), and may subsequently apply different control mechanisms based on the detected conditions. In some of the present implementations, a local manager (or a serving cell) of an SL-Group may determine (e.g., based on the CBR reports received from one or more other UEs) which control mechanism to apply. In some of the present implementations, in a unicast scenario, both of the UEs in the SL-unicast communication may negotiate to achieve a control mechanism to apply.

FIG. 1 is a diagram illustrating a UE delivering a sidelink measurement report to another UE in a coverage area of a cell, according to an example implementation of the present application. Even though the sidelink communications illustrated in this figure are between the in-coverage UEs, it should be noted that the implementations described above and below may equally apply to the out-of-coverage UEs and partial-coverage UEs. FIG. 1 includes a base station 100 (e.g., a gNB or an eNB) with a cell 105 having a coverage area, and UEs 110 and 120, among several other UEs within the coverage area of the cell 105.

In some of the present implementations, the UEs 110 and 120 may have been grouped together (e.g., by one or more upper layers, such as the Application layer (e.g., V2X layer), Non-Access Stratum (NAS) layer in Core Network (e.g, 5GC), Layer 2 (e.g., RRC layer), etc.) to exchange sidelink packets with each other. In some of the present implementations, the UEs may have further been configured (e.g., by the upper layers) to use a unicast approach for sidelink communication. One or more feedback channels (e.g., PC5 channels) may also have been configured for each of the UEs 110 and 120. As such, each of the UEs 110 and 120 may transmit sidelink data, including an SL-measurement report, to each other through the configured feedback channel. As shown in FIG. 1, the UE 110 is delivering a sidelink measurement report (e.g., a CBR report) to the UE 120 via an established channel (e.g., a PC5 interface) between the UE 110 and the UE 120.

Figure 2:
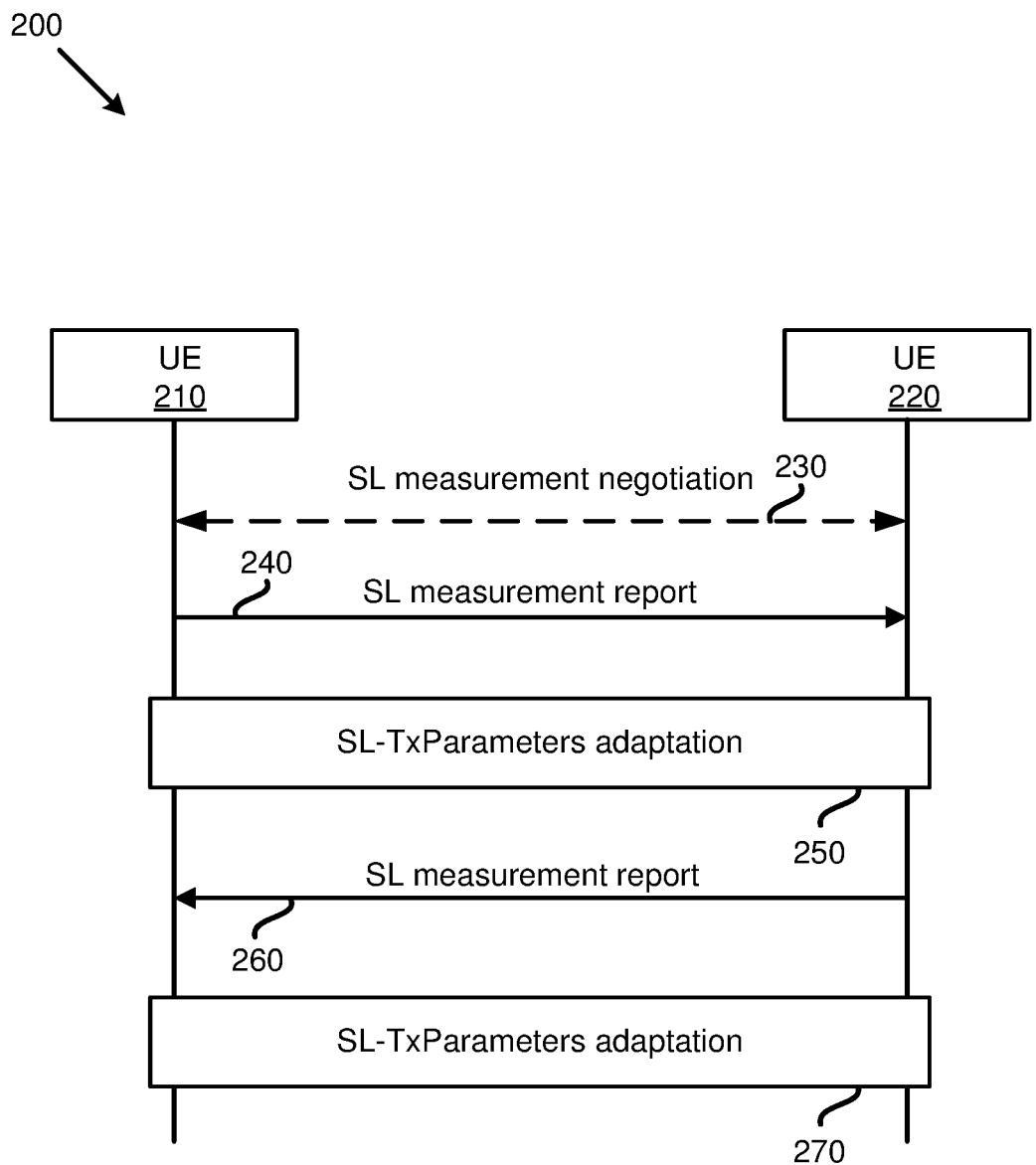
FIG. 2 is a signaling flow diagram illustrating two UEs of the same sidelink group exchanging sidelink report measurements, according to an example implementation of the present application.

FIG. 2 is a signaling flow diagram illustrating two UEs of the same sidelink group exchanging sidelink report measurements, according to an example implementation of the present application. In FIG. 2, diagram 200 includes UEs 210 and 220 in communication with each other. In action 230, the UEs 210 and 220 may negotiate sidelink measurement related information between themselves. This information, in some of the present implementations, may include SL-measurement capability data (e.g., the UE's capabilities to prepare and exchange SL-measurement reports) and/or SL-measurement configuration data (e.g., which SL Pools to measure in which SL-CC, etc.). After the SL-measurement negotiation in action 230, one or both of the UEs 210 and 220 may keep monitoring at least one SL-resource pool (e.g., that is indicated during the negotiation) during a time period.

The SL-resource pool may be configured for (or associated with) NR or LTE. In some of the present implementations, in the SL-measurement capability (or configuration) data, one NR-V2X UE (e.g., a UE that subscribes to an NR-V2X service) may indicate its capability for monitoring the LTE sidelink resource pools and/or NR sidelink resource pools. In addition, in the SL-measurement configuration data, one NR-V2X UE (or an LTE-V2X UE, which is a UE that subscribes to an LTE-V2X service) may also be configured to monitor SL Pools associated with the LTE-V2X sidelink data exchange. In comparison, an NR-V2X UE/LTE-V2X UE may also be configured to monitor SL Pools associated with the NR-V2X sidelink data exchange. Therefore, a UE may submit the SL-measurement reports associated with the LTE SL Pools and/or NR SL Pools through a PC5 interface (e.g., an LTE PC5 interface or an NR PC5 interface) by monitoring the NR SL Pools and/or LTE SL Pools.

In action 240, the UE 210 may send a sidelink measurement report to the UE 220. In some of the present implementations, the UE 210 may transmit the report through a configured feedback channel (e.g., an NR PC5 interface or an LTE PC5 interface). After receiving the SL-measurement report, the UE 220 may adjust, in action 250, its SL-TxParameters by jointly considering the SL-measurement results evaluated at the UE 220 as well as the SL-measurement results included in the SL-measurement report received from the UE 210.

Similarly, in some of the present implementations, the UE 220 may also send, in action 260, a sidelink measurement report to the UE 210. The sidelink measurement report may include the measurement results calculated at the UE 220's side. In some of the present implementations, the UE 220 may transmit the report to the UE 210 via the configured feedback channel. After receiving the SL-measurement report, the UE 210 may adjust, in action 270, its SL-TxParameters by jointly considering the SL-measurement results evaluated at the UE 210 (e.g., the measurement results included in the SL-measurement report sent to the UE 220 in action 240, or updated measurement results), as well as the SL-measurement results included in the SL-measurement report received from the UE 220.

It should be noted that the feedback channel between the UEs for exchanging the SL-measurement reports may be associated with a first RAT (e.g., an NR PC5 interface, or an LTE PC5 interface), while the isolated (and monitored) SL-resource pools (SL Pools) may be associated with a second RAT that may be the same as, or different from, the first RAT (e.g., configured to an LTE PC5 interface or an NR PC5 interface). In some of the present implementations, through which interface (e.g., the NR PC5 interface, or the LTE PC5 interface) the SL-measurement reports to be transmitted may also be determined through the SL-measurement negotiation in action 230.

In some of the present implementations, the SL-measurement report may be transmitted between the UEs via Sidelink Feedback Control Information (SFCI), which may be carried by a Signaling Radio Bearer (SRB) or a Data Radio Bearer (DRB) on an NR/LTE PC5 interface between the UEs. The SL-measurement report may be protected by a Hybrid Automatic Repeat Request (HARQ) procedure (e.g., processed by a sidelink HARQ entity in the MAC layer) and an Automatic Repeat Request (ARQ) procedure (e.g., processed by an ARQ procedure in the RLC layer with Acknowledge mode or Un-Acknowledge mode). In the physical layer, the SFCI may be transmitted on the PSCCH, the PSSCH, or a new physical sidelink channel on the NR PC5 interface (e.g., Physical Sidelink Feedback Channel, PSFCH).

In some aspects of the present implementations, the SL-measurement negotiation may be exchanged between the UEs on an LTE PC5 interface. In some of such implementations, the following SL-measurement reports may cover another UE's SL-measurement results (e.g., the SL-measurement of other UE(s) in the same SL-group) on an LTE PC5 interface of the other UE, or an NR PC5 interface of the other UE. Additionally, the SL-measurement reports (e.g., in actions 240 and 260 in FIG. 2) may be delivered through an NR PC5 interface and/or an LTE PC5 interface, in which case, the type of the interface may also be determined at the SL-measurement negotiation phase (e.g., action 230 in FIG. 2).

Figure 3:
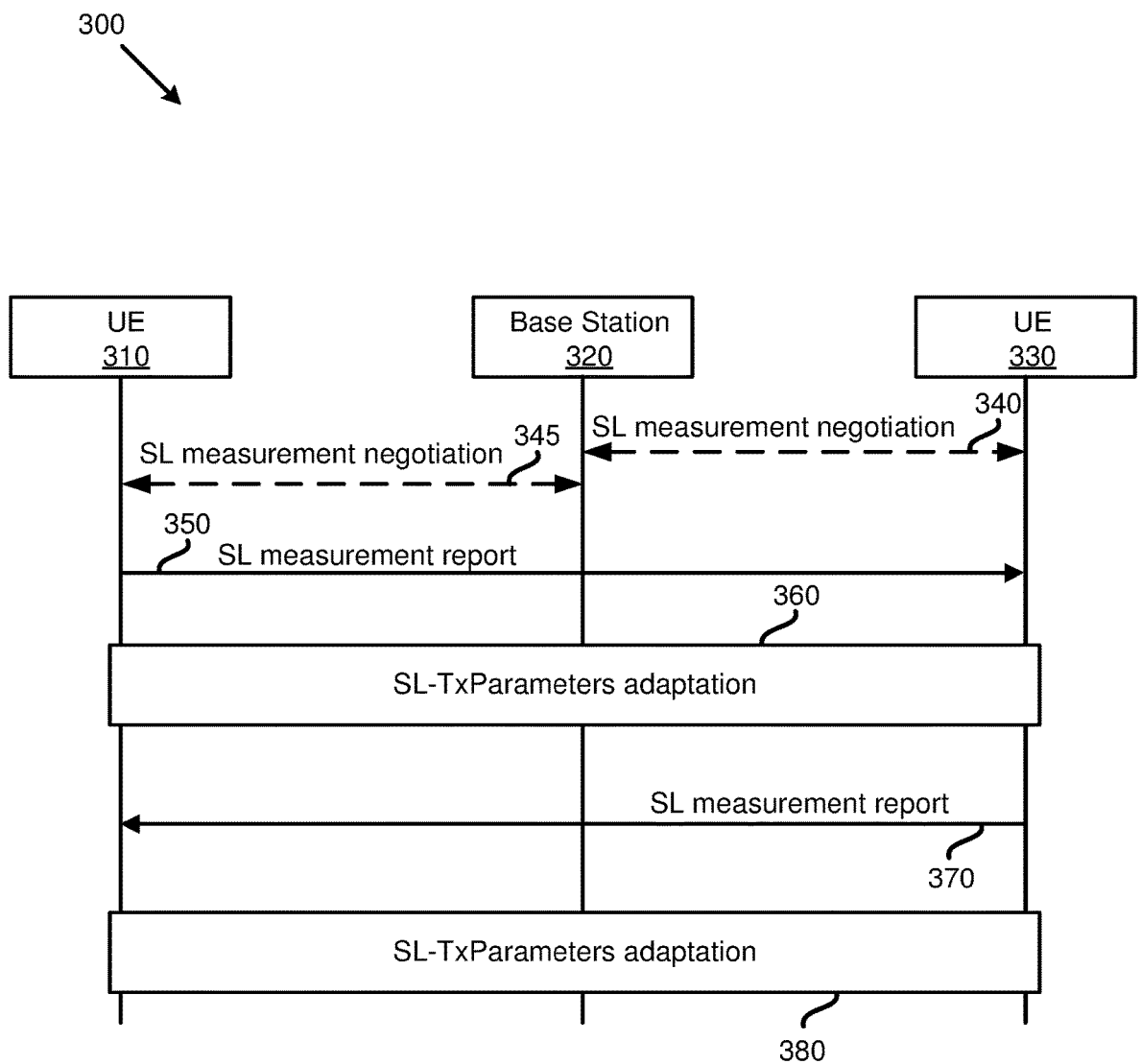
FIG. 3 is a signaling flow diagram illustrating two UEs performing sidelink measurement negotiations through a base station, according to an example implementation of the present application.

FIG. 3 is a signaling flow diagram illustrating the sidelink measurement negotiations between the UEs performed through a base station, according to an example implementation of the present application. In FIG. 3, diagram 300 includes a UE 310, a base station 320, and a UE 330 in communication with one another. In contrast to the implementation shown in FIG. 2, the negotiation for sidelink measurement reports in FIG. 3 is not performed directly between the UEs. Instead, the SL-measurement negotiation procedure may be realized through the coordination of one or more base stations. That is, as shown in FIG. 3, each of the UEs 310 and 330 may negotiate the sidelink measurement related information with the base station 320 (e.g., the base station 100 shown in FIG. 1), and the base station 320 may relay the negotiated information to the other UE. In some of the present implementations, the base station 320 may exchange dedicated control signaling (e.g., RRC signaling on an NR Uu interface or an LTE Uu interface), such as RRCConnection(Re)Establishment message, RRCConnectionRelease message with/without suspend configuration, RRCConnectionReconfiguration message with/without mobilitycontrolinfoV2X, or RRCConnectionReconfiguration message with/without reconfigurationwithsync message, to activate the SL-measurement reporting between the UEs 310 and 330.

In action 340, the UE 330 may negotiate the sidelink measurement related information with the base station 320. Similarly, in action 345, the UE 310 may also negotiate the sidelink measurement related information with the base station 320. As described above, the sidelink measurement related information, in some of the present implementations, may include SL-measurement capability data (e.g., the UE's capabilities to prepare and exchange (NR/LTE) SL-measurement reports) and/or SL-measurement configuration data (e.g., which SL Pools to measure, etc.). After the SL-measurement negotiation, in actions 340 and 345, at least one of the UEs 310, 330 may keep monitoring at least one SL-resource pool (e.g., that is indicated during the negotiation) during a time period.

In action 350, the UE 310 may send a sidelink measurement report to the UE 330. In some of the present implementations, the UE 310 may transmit the report through a configured feedback channel (e.g., an NR PC5 interface). After receiving the SL-measurement report, the UE 330 may adjust, in action 360, its SL-TxParameters by jointly considering the SL-measurement results evaluated at the UE 330 as well as the SL-measurement results included in the SL-measurement report received from the UE 310.

Similarly, in some of the present implementations, the UE 330 may also send, in action 370, a sidelink measurement report to the UE 310. The sidelink measurement report may include the measurement results calculated at the UE 330's side. In some of the present implementations, the UE 330 may transmit the report to the UE 310 via the configured feedback channel. After receiving the SL-measurement report, the UE 310 may adjust, in action 380, its SL-TxParameters by jointly considering the SL-measurement results evaluated at the UE 310 (e.g., the measurement results included in the SL-measurement report sent to the UE 330 in action 350, or updated measurement results), as well as the SL-measurement results included in the SL-measurement report received from the UE 330.

As described above, the feedback channel (e.g., a Physical Sidelink Control Channel (PSCCH), physical feedback channel (PSFCH), or a Physical Sidelink Shared Channel (PSSCH) configured in the SL-CC(s) associated with the UEs 310 and 330) between the UEs 310 and 330 for exchanging the SL-measurement reports may be associated with a first RAT (e.g., an NR PC5 interface or an LTE PC5 interface) in some of the present implementations. Similarly, the monitored SL-resource pool(s) may be associated with a second RAT (e.g., configured to the LTE PC5 interface and/or the NR PC5 interface) that may be the same as, or different from, the first RAT. In some of the present implementations, through which interface (e.g., the NR PC5 interface, or the LTE PC5 interface) the SL-measurement reports to be transmitted may also be determined through the SL-measurement negotiation in actions 340 and 345.

Additionally, in some aspects of the present implementations, the SL-measurement negotiation may be exchanged between the UEs on an LTE PC5 interface. In some of such implementations, the following SL-measurement reports may cover the other UE's SL-measurement results on an LTE PC5 interface or an NR PC5 interface of the other UE. Additionally, the SL-measurement reports (e.g., in actions 350 and 370) may be delivered through an NR PC5 interface and/or an LTE PC5 interface, in which case, the type of the interface may also be determined at the SL-measurement negotiation phase (e.g., actions 340 and 345).

In some of the present implementations, the SL-measurement report on an LTE PC5 interface may only be applied to determine the SL-TxParameters adaptation of the LTE PC5 interface. Conversely, in some aspects of the present implementations, the SL-measurement report on an NR PC5 interface may only be applied to determine the SL-TxParameters adaptation of the NR PC5 interface. In some aspects of the present implementations, the SL-resource pools may be applicable to both NR SL-packet deliveries and LTE SL-packet deliveries. As such, one CBR/CR value may be applicable to the SL-TxParameters adaptation on both of the LTE PC5 and NR PC5 interfaces in some of the present implementations.

Figure 4:
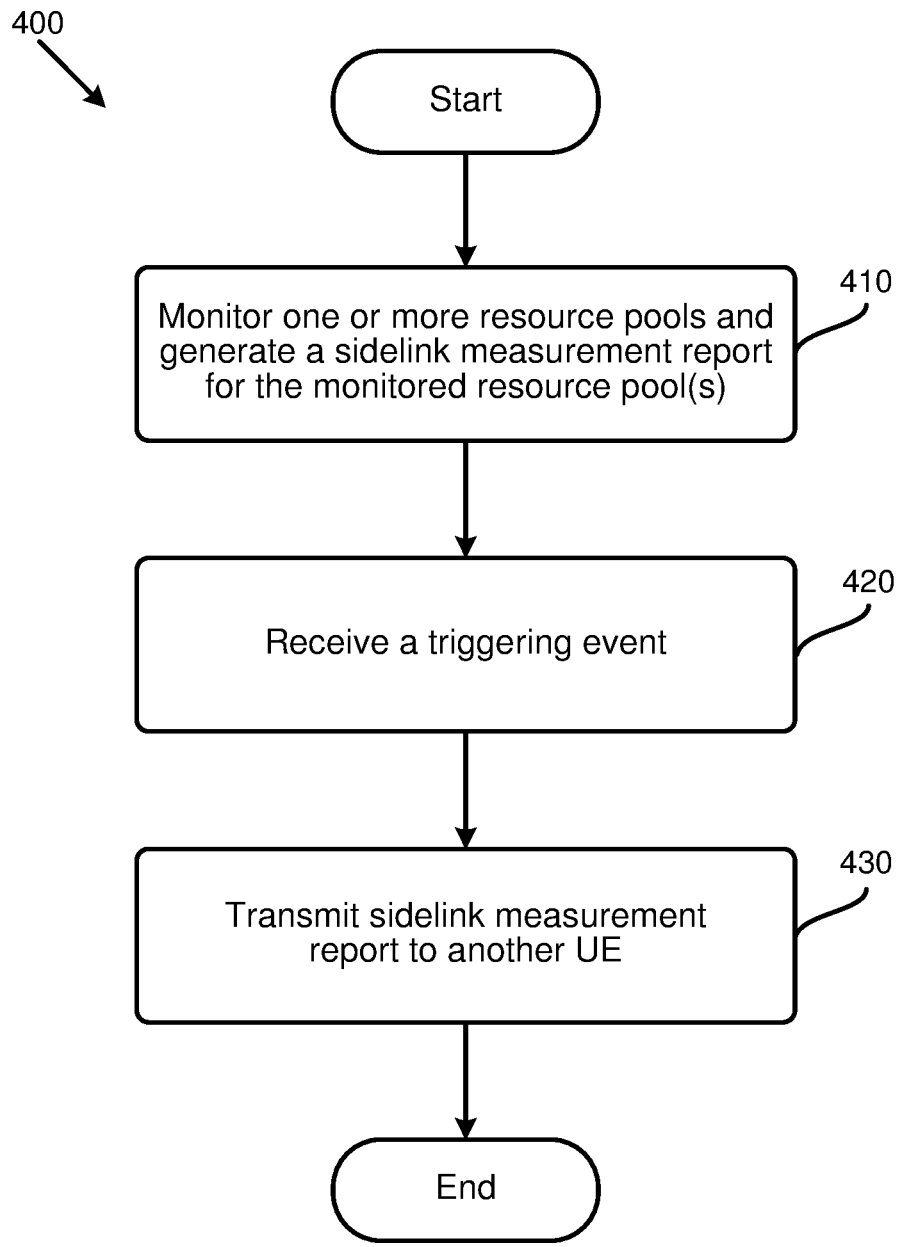
FIG. 4 is a flowchart illustrating a method (or process) performed by a UE for transmitting a sidelink measurement report to another UE, according to an example implementation of the present application.

FIG. 4 is a flowchart illustrating a method (or process) 400 performed by a UE for transmitting a sidelink measurement report to another UE, according to an example implementation of the present application. In action 410, a UE may monitor one or more resource pools allocated to the UE for sidelink communications for a certain time period and then generate a sidelink measurement report (e.g., a CBR report) for the monitored resource pool(s).

In action 420, the UE may receive at least one triggering event for submitting the generated sidelink measurement report to one or more other UEs (that are in the same sidelink group as the UE). A triggering event, as described above, may be a new UE joining the sidelink group, the local manager of the sidelink group sending a request (e.g., through PC5 RRC signaling) to the UE for the SL-measurement report, a measurement result being higher/lower than a specific (e.g., predefined) threshold, at a certain periodicity.

In action 430, the UE may transmit the sidelink measurement report to the other UE, for example, through a (LTE/NR) PC5 interface established between the UEs. The PC5 interface may be a configured feedback channel (e.g., an NR PC5 interface or an LTE PC5 interface) between the UEs. After receiving the sidelink measurement report, the other UE may adjust one or more of its sidelink transmission parameters based on the sidelink measurement report (and based on the measurement results calculated by the other UE). It should be noted that before sending the sidelink measurement report, the UEs may have negotiated sidelink measurement related information between themselves. The sidelink measurement related information may include SL-measurement capability data (e.g., the UE's capabilities to prepare and exchange (LTE/NR) SL-measurement reports) and/or (LTE/NR) SL-measurement configuration data (e.g., which (LTE/NR) SL Pools to measure, etc.). The method 400 may then end.

As described above, one of the triggering events for a UE to provide a sidelink measurement report to another UE is when the other UE initiates a sidelink packet delivery. For example, a first UE may have been monitoring one or more SL-resource pools for a time period when a second UE becomes a new member of SL-Group of which the first UE is also a member. When the second UE becomes a new member of the SL-group, the second UE may not have any available SL-measurement results for the corresponding SL-resource pool(s) (which are being monitored by the first UE). For example, the second UE may not be capable of monitoring the SL Pools, or the second UE may need to continuously monitor (at least) one target SL resource pool for a time period to obtain available SL-measurement results. As such, in some of the present implementations, for further optimization (e.g., SL-TxParameters adaptation based on the monitored CBR), the first UE may prepare and deliver an SL-measurement report (e.g., including the CBR of the corresponding resource pools) to the second UE. In some of the present implementations, the second UE may send a request signaling (e.g., through PC5 RRC signaling in the NR PC5 interface) to request from the first UE to transmit the SL-measurement report to (at least) one target SL resource pool.

The second UE may then apply an SL-TxParameters adaptation based on the received SL-measurement report from the first UE. The second UE may use the measurement report received from the first UE (e.g., until the second UE has its own CBR available). The second UE may also monitor the resource pools and produce its own SL-measurement results. After obtaining its own measurement results, the second UE may jointly use the received measurement results and the produced measurement results to adjust the transmission parameters (or to apply the SL-TxParameters adaptation) at the second UE. In some of the present implementations, the first UE may be the local manager of the SL-group which includes, at least, the first and second UEs. The SL-group may have been defined by the serving base station, based on pre-configuration data stored at the first UE, or the group may have been initialized by the first and second UEs themselves.

Figure 5:
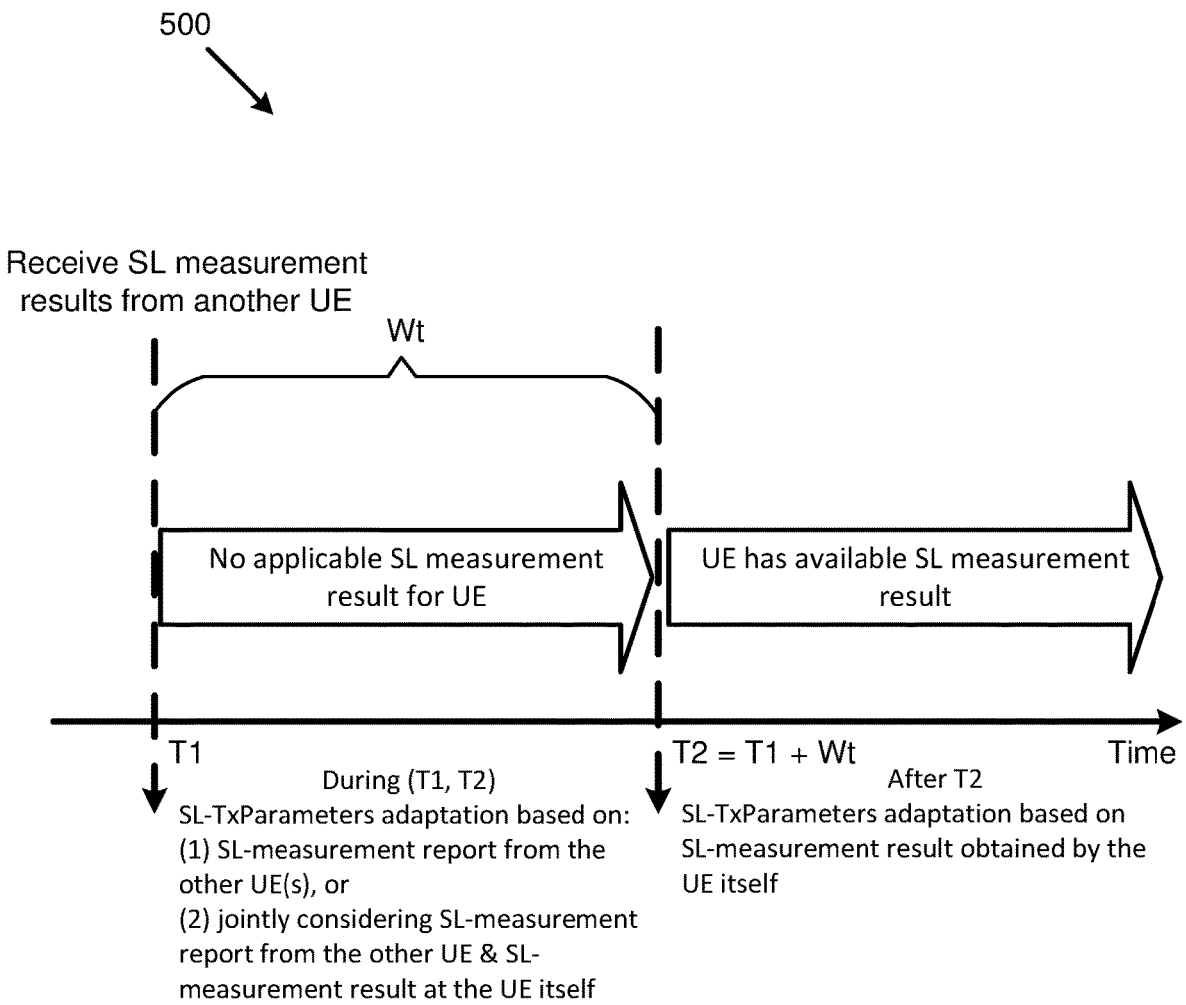
FIG. 5 is a diagram illustrating a UE adjusting transmission parameters based on both a received sidelink measurement report and measurement results produced by the UE, according to an example implementation of the present application.

FIG. 5 is a diagram illustrating a UE adjusting transmission parameters based on both a received sidelink measurement report and measurement results produced by the UE, according to an example implementation of the present application. As shown in FIG. 5, in diagram 500, a UE may receive an SL-measurement report from another UE at time T1 (e.g., when the UE starts the SL packet delivery, when the UE becomes a member of the SL-group, etc.). After the time T1, the UE may start recording its own SL-measurement results continuously, for example, within an observation time window (the observation time window Wt in FIG. 5). The UE, however, may not be able to obtain available SL-measurement results until the time T2.

In some of the present implementations, the UE may implement the SL-TxParameters adaptation based on the SL-measurement report received from the other UE until the time T2. After the time T2, the UE may implement the SL-TxParameters adaptation based on its own SL-measurement results in some of the present implementations. In some aspects of the present implementations, between the time T1 and T2, the UE may implement the SL-TxParameters adaptation by jointly considering the SL-measurement report received from the other UE and the UE's own recorded SL-measurement results. For example, in some of such implementations, the UE may calculate the linear average of the measurement results at time Tk (between T1-T2) based on the following formula:

$$\{(Tk-T1)*CBR\_UE\ \#1+(T2-Tk)*CBR\_UE\ \#2\}/(T2-T1)$$

In the above formula, UE #1 is the UE that receives the SL-measurement report from UE #2, CBR_UE #1 is the average CBR obtained by the UE #1 during (T1, Tk), and CBR_UE #2 is the CBR report that the UE #1 obtains from the UE #2 at the time T1. Some of the present implementations may apply the above formula, to calculate the CBR for the UE #1 at the time Tk (between the times T1 and T2).

Another triggering event for a UE to provide a sidelink measurement report to another UE, in some of the present implementations, is when the SL-measurement result is higher than a first (predefined) threshold, or the SL-measurement result is lower than a second (predefined) threshold. That is, a UE may deliver an SL-measurement report to another UE (e.g., that is in the same SL-group) when the SL-measurement result is above or below a particular threshold. In some of the present implementations, similar to the event V1/V2 described above with reference to the LTE/NR V2X service, the triggering event for the SL-measurement report may be as defined in the following Table 5. It should also be noted that the Event V1a in Table 5 may be associated with an LTE sidelink or an NR sidelink. In addition, a UE may also be configured with the Event V1a associated with the LTE sidelink and/or NR sidelink. In some of the present implementations, different parameters may be configured for the LTE sidelink and NR sidelink in one UE.

TABLE 5

Event V1a (The channel busy ratio is above a threshold)
UE may start a CBR report on (LTE/NR) PC5 interface if the entering condition (Inequality V1-1) is fulfilled.
UE may stop the CBR report on (LTE/NR) PC5 interface if the leaving condition (Inequality V1-2) is fulfilled.
The UE may:
1> consider the entering condition for this event to be satisfied when condition V1-1, as specified below, is fulfilled;
1> consider the leaving condition for this event to be satisfied when condition V1-2, as specified below, is fulfilled;
Inequality V1-1 (Entering condition)
Ms − Hys > Thresh
Inequality V1-2 (Leaving condition)
Ms + Hys < Thresh Ms is the measurement result of channel busy ratio of the transmission resource pool, may not taking into account any offsets.
Hys is the hysteresis parameter for this event, for which the value could be decided through SL- measurement negotiation or by pre-configuration, or by base station configuration.
Thresh is the threshold parameter for this event, for which the value could be decided through SL-measurement negotiation or by pre-configuration, or by serving base station configuration.
Ms is expressed in decimal from 0 to 1 in steps of 0.01.
Hys is expressed is in the same unit as Ms.
Thresh is expressed in the same unit as Ms.

The UE may trigger an SL-measurement report (e.g., a CBR report) when the inequality V1-1 is fulfilled in some of the present implementations. Similarly, the UE may stop transmitting the CBR report when the inequality V1-2 is fulfilled, as defined in the above Table 5. Conversely, in some of the present implementations, the triggering event V2a may also trigger an SL-measurement report, as defined in Table 6 below. It should also be noted that the Event V2a in Table 6 may be associated with the LTE sidelink or NR sidelink. In addition, a UE may also be configured with the Event V2a, associated with the LTE sidelink and/or NR sidelink. In some of the present implementations, different parameters may be configured for the LTE sidelink and NR sidelink in one UE.

TABLE 6

Figure 6:
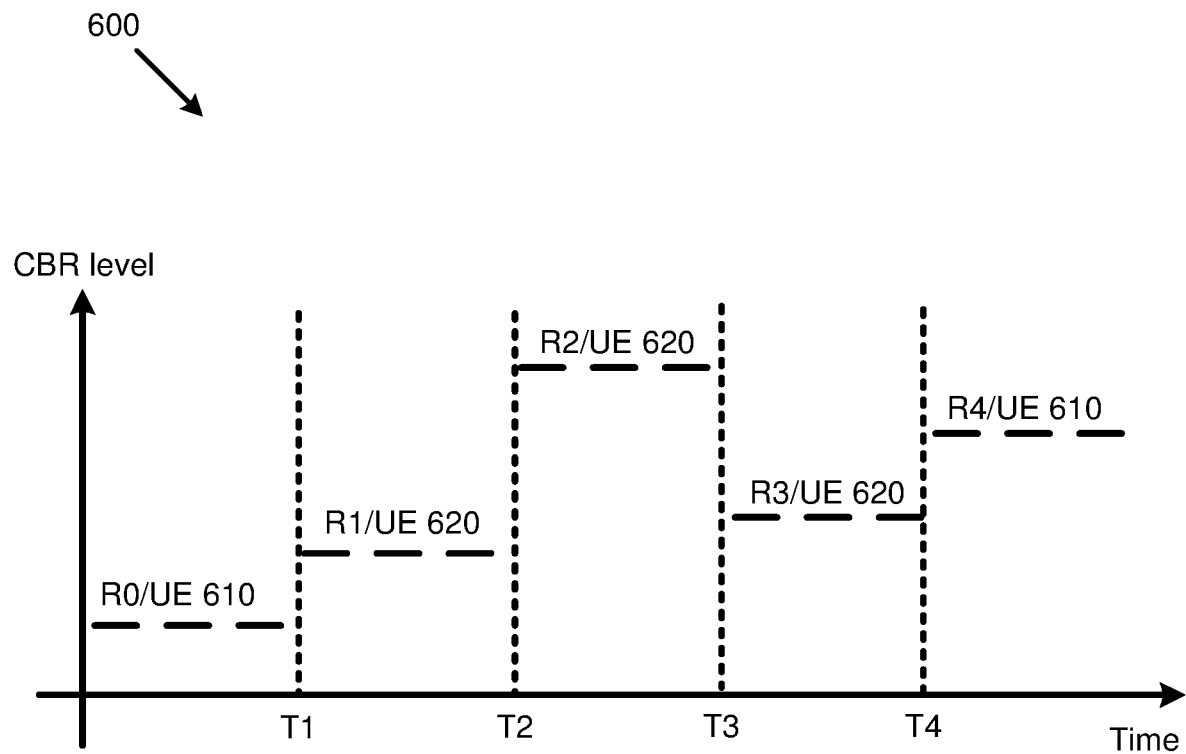
FIG. 6 is a diagram illustrating a dynamic determination of adjusting sidelink transmission parameters based on measurement reports provided by multiple UEs, according to an example implementation of the present application.

Event V2a (The channel busy ratio is below a threshold)
UE may start a CBR report on (LTE/NR) PC5 interface if the entering condition (Inequality V2-1) is fulfilled.
UE may stop the CBR report on (LTE/NR) PC5 interface if the leaving condition (Inequality V2-2) is fulfilled.
The UE may:
1> consider the entering condition for this event to be satisfied when condition V2-1, as specified below, is fulfilled;
1> consider the leaving condition for this event to be satisfied when condition V2-2, as specified below, is fulfilled;
Inequality V2-1 (Entering condition)
Ms + Hys < Thresh
Inequality V2-2 (Leaving condition)
Ms − Hys > Thresh In some of the present implementations, the threshold for an SL-measurement report may be decided dynamically, for example, based on the SL-measurements exchanged between the UEs. FIG. 6 is a diagram illustrating a dynamic determination of adjusting sidelink transmission parameters based on measurement reports provided by multiple UEs, according to an example implementation of the present application. More specifically, diagram 600 is a time-CBR level grid that shows how different CBR reports may be triggered dynamically by the CBR values going above or below certain thresholds.

In diagram 600, at time T0, a UE 610 may deliver a CBR report (including a value R0) to another UE 620 (e.g., based on the UE 620 not having any available CBR result at the time T0). Then, both of the UEs 610 and 620 may implement an SL-TxParameters adaptation based on the CBR=R0 in some of the present implementations. At the time T1, the UE 620 may send an updated CBR value (e.g., R1) to the UE 610 if the UE 620 observes R1+Hys>R0, for which the value of Hys may be decided through the SL-measurement negotiation, or based on pre-configuration, or via the configuration configured by the serving base station (Hys≥0) in some of the present implementations.

After the updated CBR value R1 is delivered, the UEs 610 and 620 may implement the SL-TxParameters adaptation based on the R1 value. In some of the present implementations, a UE may decide whether to transmit its own CBR report by jointly considering the received CBR report from the paired UE. In some of the present implementations, the UE 610 may not send its own CBR result after receiving the CBR report R1 from the UE 620 because the CBR result observed by the UE 610 may be lower than the R1 value (unless the UE 620 has monitored a CBR value that is higher than R1+Hys (Event V1a)). As such, Event V2a, with reference to Table 6 above, may be deactivated for the UE 610. Additionally, in some of the present implementations, the UE 620 (and not the UE 610) may be responsible to transmit a new CBR report when the CBR value is higher than R1+Hys (Event V1a), or lower than R1-Hys (Event V2a).

As shown in FIG. 6, at the time T2, the UE 620 may deliver another CBR report (with CBR value=R2) because, for example, R2>R1+Hys at the time T2 and, as such, further SL-TxParameters adaptation may need to be implemented based on the new CBR value (R2). Later, at the T3, the UE 620 may send another CBR report (with CBR value=R3), while the R3<R2-Hys. Therefore, the R3 value may become the new basis for additional CBR reporting. Finally, at the time T4, the first UE 610 may send another CBR report to the UE 620 (with CBR value=R4) because R4>R3+Hys at the time T4. As a result, after T4, the UEs 610, 620 may implement the SL-TxParameters adaptation based on the updated CBR value (R4).

Figure 7:
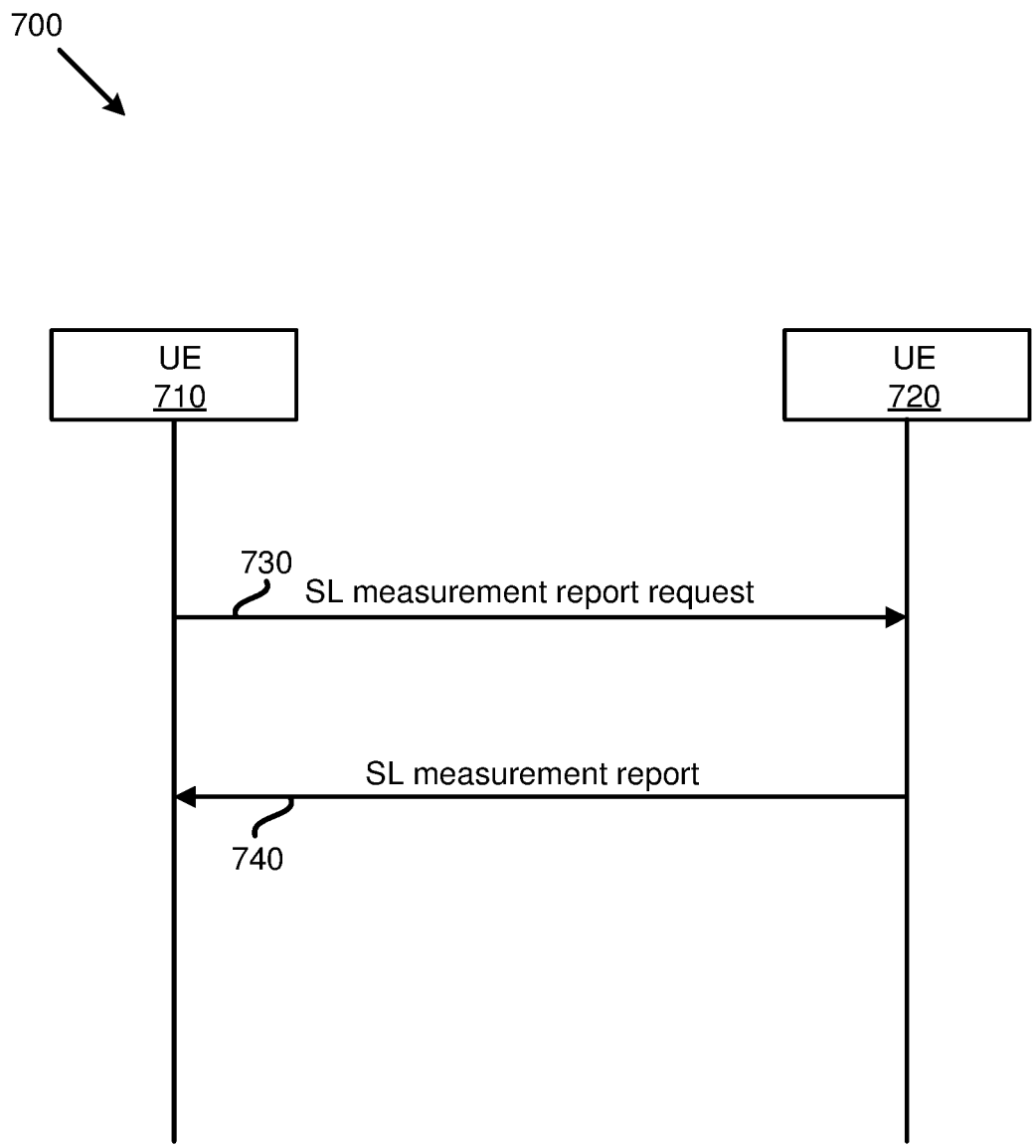
FIG. 7 is a diagram illustrating a first UE providing a second UE with a sidelink measurement report when the first UE receives a request from the second UE, according to an example implementation of the present application.

Another triggering event for a UE to provide a sidelink measurement report to another UE, in some of the present implementations, is when the UE receives a measurement report request from another UE. FIG. 7 is a diagram 700 illustrating a first UE providing a second UE with a sidelink measurement report when the first UE receives a request from the second UE, according to an example implementation of the present application. The figure includes UEs 710 and 720 communicating with each other for delivering a sidelink measurement report.

In action 730 of FIG. 7, the UE 710 may send an SL-measurement request to the UE 720. For example, in some of the present implementations, the UE 710 may send a CBR report request to the UE 720 by sending a dedicated control signaling to the UE 720 through a PC5 interface (e.g., an NR PC5 interface or an LTE PC5 interface). In some of the present implementations, the UE 710 may be an SL-Group leader in an SL-group for unicast service/groupcast service, and may send the SL-measurement report request message (e.g., through an RRC signaling in PC5 interface, such as RRCConnection(Re)Establishment message, RRCConnectionRelease message with/without suspend configuration, RRCConnectionReconfiguration message with/without mobilitycontrolinfoV2X, or RRCConnectionReconfiguration message with/without reconfigurationwithsync message.) to the UE 720 for an SL-measurement report (e.g., a CBR or a CR report generated by the UE 720).

After receiving the SL-measurement report request, the UE 720 may reply, in action 740, by sending the request SL-measurement report to the UE 710. As described above, some of the present implementation may support an inter-RAT SL-measurement report request. For example, the UE 710 may send the SL-measurement report request of an NR PC5 interface (e.g., a report of the traffic congestion at the NR PC5 interface of the UE 720) through a dedicated control signaling on an LTE PC5 interface (e.g., of the UE 710) in some of the present implementations. That is, in some of the present implementations, the UE 710 may send an SL-measurement report request of an NR PC5 interface (e.g., with indicated NR SL Pools on (at least) one SL-CC) to the UE720 through an LTE PC5 interface. Then, the UE 720 may transmit SL-measurement report of the indicated NR SL Pools also through the LTE PC5 interface with the UE 710.

Conversely, in some of the present implementations, the UE 710 may send an SL-measurement report request of an LTE PC5 interface (e.g., with indicated LTE SL Pools on (at least) one SL-CC) to the UE720 through an NR PC5 interface (e.g., through PC5 RRC signaling). Then, the UE 720 may transmit SL-measurement report of the indicated LTE SL Pools also through the NR PC5 interface (e.g., through PC5 RRC signaling) with the UE 710.

Another triggering event for a UE to provide a sidelink measurement report to other UEs, in some of the present implementations, upon expiration of certain time intervals (e.g., periodically). For example, a UE that is a local manager of an SL-group (e.g., in FIG. 1, the UE 110 is a local manager of the UE 120, and the other UEs within the cell 105) may provide its observed (or calculated) SL-measurement results (e.g., the CBR values observed by the UE 110) to the other UEs (e.g., including the UE 120) in the SL-Group periodically, or aperiodically. In some of the present implementations, a serving base station (e.g., the base station 100) of the local manger (e.g., the UE 110) may indicate the periodicity of the SL-measurement report to the local manager for transmitting the SL-measurement report. In some other aspects of the present implementations, the local manager may decide the periodicity autonomously (e.g., based on the pre-configuration data saved at the UE).

In some aspects of the present implementations, In some of the present implementations, the local manager may deliver the SL-measurement results to another UE (or other UEs) in the SL-group only while the distance between the other UE(s) and the local manager is shorter than a pre-defined threshold distance (e.g., a predefined threshold $X_{SL-meas}$ (meters) may have been preconfigured for the SL-group). As such, the local manager may deliver the SL-measurement results to one or more target UEs while the distance(s) between the local manager and the target UE(s) is shorter than $X_{SL-meas}$. Conversely, in some of the present implementations, the local manager (or group leader) may not deliver the SL-measurement results to one or more UEs in the SL-group while the distance(s) between the local manager and the concerned UE(s) is larger than the pre-defined threshold distance. For an in-coverage SL-group and/or partial-coverage SL-group, the serving cell may configure the value of $X_{SL-meas}$ and SL-measurement configuration through a broadcast message (e.g., system information broadcasting or SI on-demand procedure, as indicated in the NR specifications), or through dedicated control signaling (e.g., through RRC signaling). For an out-of-coverage UE, the value of $X_{SL-meas}$ and SL-measurement configuration may be obtained through sidelink preconfiguration and/or from other UEs (e.g., through PC5 RRC signaling).

In addition, the local manager may start providing its SL-measurement results when at least one of the triggering events (e.g., Event Via/Event V2a, or any other triggering event described above and below) is fulfilled. In some of the present implementations, the triggering events (and the corresponding thresholds) may be determined (or provided) by a serving base station or by the local manager itself (e.g., through the local manager's configuration). In the unicast scenario, in some of the present implementations, the local manager may provide the SL-measurement report prepared by the local manager to one or more UE's in the group through a dedicated control signaling. In some of such implementations, the SL-measurement report may be protected by the sidelink (unicast) HARQ.

Figure 8:
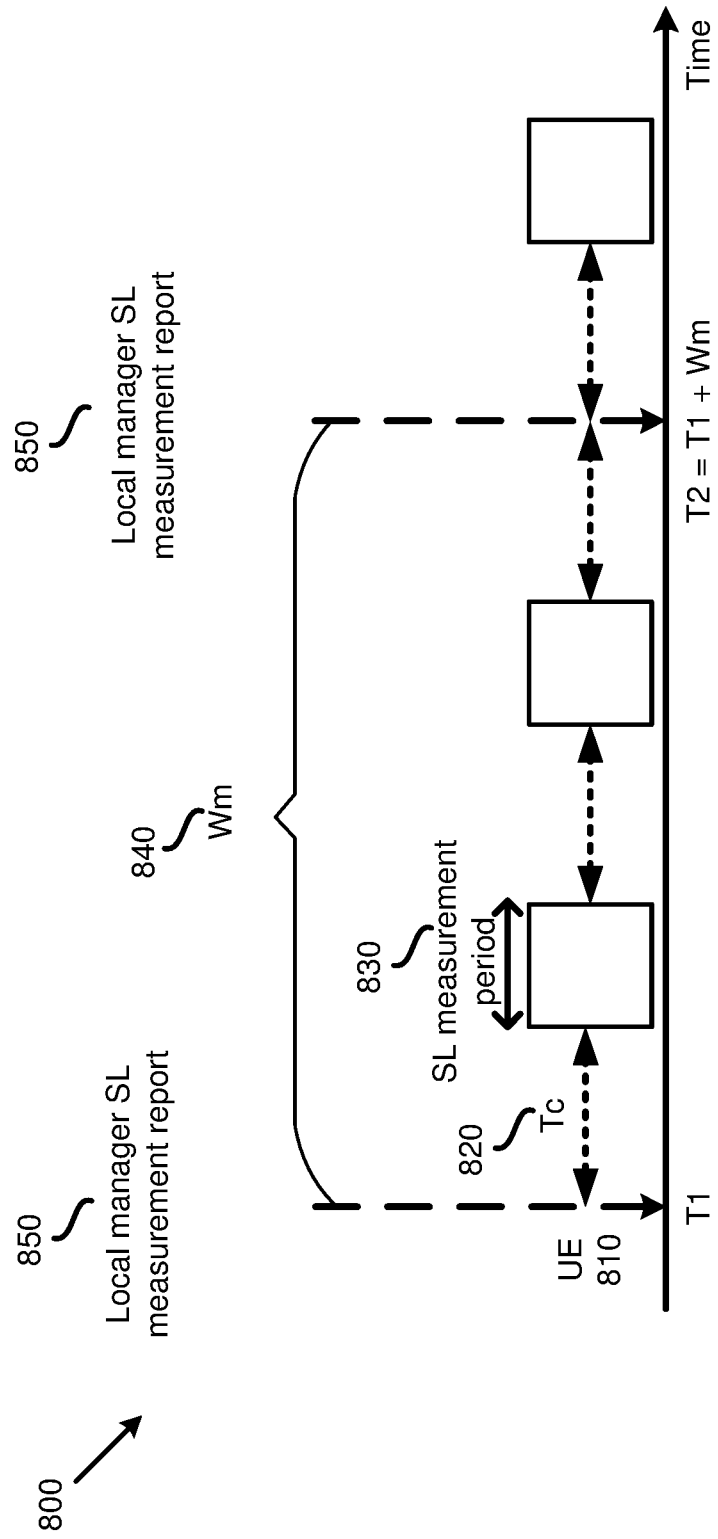
FIG. 8 is a diagram illustrating how a local manager of a sidelink group providing SL-measurement reports to other UEs in the sidelink group may help decrease the SL-measurement loads on the other UEs, according to one implementation of the present application.

After receiving the SL-measurement report from the local manager, the UEs in the SL-Group may adjust their own SL-TxParameters accordingly. In addition, in some of the present implementations, the UEs may not have to monitor the sidelink channel(s) as often (if at all) for the SL-measurements. FIG. 8 is a diagram 800 illustrating how a local manager of a sidelink group providing SL-measurement reports to other UEs in the sidelink group may help decrease the SL-measurement loads on the other UEs, according to one implementation of the present application. FIG. 8 shows SL-measurement (e.g., CBR) performed by a UE 810, which is one of the members of a SL-group managed by a local manager, at Tc 820 time intervals. The UE 810 may also receive the local manager's SL-measurement reports 850 (periodically/in-periodically) at Wm 840 time intervals.

As shown in FIG. 8, the local manager may unicast, or group-cast, its own SL-measurement report 850 (e.g., CBR measurement report) to the UEs, including the UE 810, in the SL-Group periodically (e.g., at times T1, T2, and so on, with a periodicity of Wm 840). Since the UE 810 may use the local manager's report to adjust the UE 810's SL-TxParameters at the times T1, T2, etc., the UE 810 may not need to monitor the sidelink channel at least at the times T1, T2, etc. in some of the present implementations. Moreover, during the SL-measurement period 830, the UE 810 may also determine whether to report the UE 810's SL-measurement report (in addition to the local manager's measurement report), for example, based on the triggering mechanisms described above and below.

In some of the present implementations, the UE 810 may adjust its SL-monitoring periodicity Tc 820 (Tc 820≥0), for example, based on the periodicity Wm 840 and/or based on the UE 810's own SL-measurement results during the SL-measurement period 830. In some of the present implementations, the Tc time may be infinite. That is, the UE 810 may not monitor the sidelink channels at all and solely rely on the received SL-measurement reports 850 the UE 810 may receive from the local manager. In some of the present implementations, the value of Tc may also be configured by the local manager and the Tc value received from the local manager may overwrite the Tc value determined by the UE 810 or preconfigured to the UE 810. Therefore, as shown in FIG. 8, some of the present implementations may decrease the loading and overhead of the sidelink channel monitoring and reporting within an SL-Group (i.e., at least at the times T1, T2, etc., the UE 810 may skip performing measurements and may rely on the measurement reports it receives from the local manager).

In some of the present implementations, through a reflective approach, a UE may adjust the sidelink transmission parameters using the sidelink measurement parameters received from another UE (e.g., without receiving any sidelink measurement report from the other UE). For example, in some of the present implementations, a first UE (e.g., an Rx UE) may obtain the SL-measurement results (e.g., the CBR) of a second UE (e.g., a Tx UE) implicitly by noticing and then comparing the SL-TxParameters of the second UE with the first UE's SL-TxParameters. In some of such implementations, the first UE may adjust its own SL-TxParameters reflectively based on the SL-TxParameters it observes at the second UE. In some of the present implementations, the second UE may configure the SL-TxParameters to the first UE directly, for example, based on the CBR results calculated at the second UE.

In some of the present implementations, a UE may receive multiple SL-measurement reports (e.g., associated with the same set of SL-resource pools) from different UEs. For example, the UE 110, with reference to FIG. 1, may receive different CBR reports from the UE 120 and the other UEs within the cell 105, where the UE 110 has an SL-unicast communication with every one of these UEs. In some of the present implementations, the UE 110 may determine the SL-TxParameters for the SL-packet transmissions to the UE 120 by jointly considering the CBRs observed by the UEs 110, 120 (e.g., the SL-TxParameters adaptation may be decided based on the maximum value among the CBR reports of the UEs 110, 120). By contrast, the UE 120 may decide the SL-TxParameters for the SL-packet transmissions to another UE by jointly considering the CBRs observed by the UE 110 and the other UE (e.g., SL-TxParameters adaptation may be decided based on the maximum value among the CBRs evaluated at the UE 110 and at the other UE). It should be noted that the implementations described above and below may also be applicable to the UEs that may be served by more than one serving cell, as well as the out-of-coverage UEs or partial-coverage SL-groups.

In some of the present implementations, a local manager may determine the SL-TxParameters for the SL-packet transmissions to all of the UEs (e.g., in a group-cast scenario) based on the observed worst case in the SL-group. For example, the UE 110 shown in FIG. 1 may determine the SL-TxParameters for the SL-packet transmissions to all of the UEs within the cell 105 (e.g., in a group-cast scenario) by jointly considering all of CBRs observed by all (or a subset) of the UEs in the SL-group, and the SL-TxParameters adaptation may be decided based on the maximum value among the observed CBRs. In some of the present implementations, a local manager (e.g., the UE 110) may not adjust the SL-TxParameters by considering its own SL-measurements (e.g., when the UE 110 does not support the SL-measurements).

In some of the present implementations, a Tx UE may transmit several SL-packets to different destinations with different SL-TxParameters simultaneously. In some of such implementations, some adjustments of the SL-TxParameters may be needed if the Tx UE's capabilities is limited (e.g., the transmission power of the Tx UE is limited). In some of the present implementations, the Tx UE may determine to fulfill the transmissions of the high priority SL-packets first (e.g., based on the ProSe Per Packet Priority value of each SL-packet or the priority of the sidelink logical channel(s) associated with the SL-packets), for example, using SL-TxParameters associated with the high priority SL-packets. In some other aspects of the present implementations, the Tx UE may postpone the low priority SL-packet transmissions.

As described above, some of the present implementations may provide a group-cast SL-measurement report for a group of UEs (e.g., the number of UEs in an SL-Group may be more than two UEs) for SL-TxParameters adaptation. In some of the present implementations, one of the UEs in the SL-Group may be the local manager of the group. The local manager, in some of such implementations, may assist in sidelink resource selection for other members (or UEs) of the group, or may schedule the sidelink transmissions of other UEs in the group. In some of the present implementations, the local manager may manage the SL-congestion control mechanism for an SL-Group.

Figure 9:
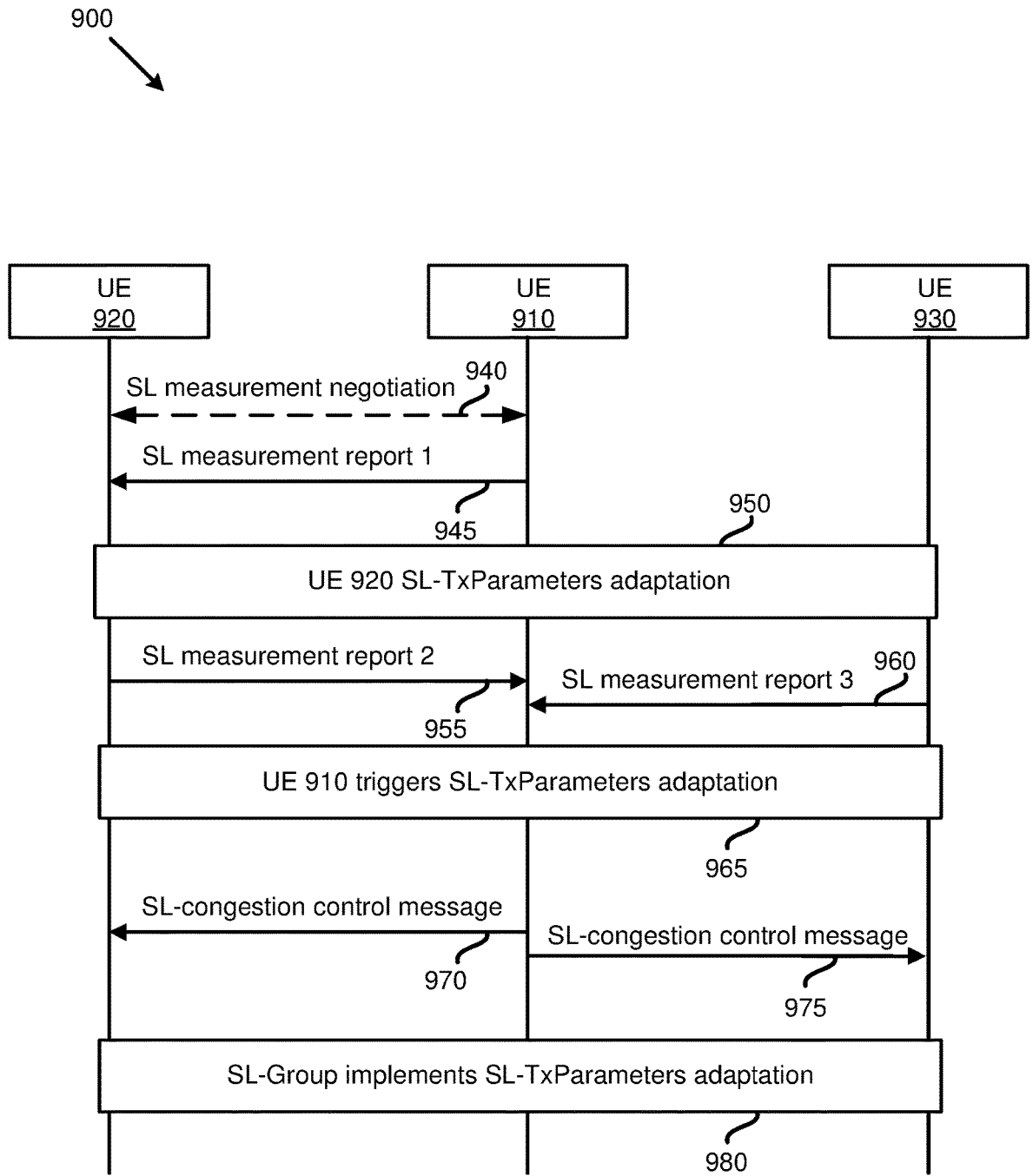
FIG. 9 is a diagram illustrating a signaling flow among different UEs of a sidelink group for adjusting sidelink transmission parameters of the group based on a sidelink congestion control message group-cast by a local manager of the group, according to one implementation of the present application.

FIG. 9 is a diagram 900 illustrating a signaling flow among different UEs of a sidelink group for adjusting sidelink transmission parameters of the group based on a sidelink congestion control message group-cast by a local manager of the group, according to one implementation of the present application. The diagram 900 includes three UEs 910, 920, and 930 communicating with each other for the SL-TxParameters adaptation. As shown in FIG. 9, the UE 910 is the local manager of an SL-Group that includes {UE 910, UE 920, UE 930}, and the UE 920 is a new member of the SL-Group (i.e., the UE 920 does not have any available SL-measurement results for SL-resource pools before action 940). It should be noted that the mechanism described with reference to FIG. 9 may not be limited to a local manager of an SL-Group, and may equally apply to a base station that serves (at least part of) the SL-Group.

In action 940, the UE 920, which is a newly added member of the SL-Group may start SL-measurement negotiations with the local manager (UE 910) for the SL-measurement report configuration. In some of the present implementations, the SL-TxParameters adaptation mechanism may be delivered from the local manager UE 910 to the UE 920 through the SL-measurement negotiations performed in action 940

In some of the present implementations, the local manager (the UE 910) may deliver, in action 945, a first SL-measurement report while the new member (the UE 920) may not have the available SL-measurement results (e.g., the CBR) to the available SL-resource pools yet. In some of the present implementations, the SL-measurement report may be obtained by monitoring result of the local manager (the UE 910) itself. In some other aspects of the present implementations, the SL-measurement report may be obtained from a serving base station of the local manager. In some aspects of the present implementations, the SL-measurement report transmitted in action 945 may be obtained from other member UEs in the SL-group.

After receiving the SL-measurement report, in action 950, the UE 920 may implement the SL-TxParameters adaptation based on the SL-measurement report received from the local manager until the UE 920 has available SL-measurement results. The UE 920 may then start implementing the SL-TxParameters adaptation based on the SL-measurement report received in the SL-measurement report from the UE 910 and also based on the UE 920's own SL-measurement results (as described above).

In some of the present implementations, the SL-measurement report received from the UE 910 may reflect the SL-measurement results (e.g., the CBR or CR in one or more than one SL-resource pool(s) in one or more SL-CC) from one or more than one UEs in the SL-Group (e.g., the local manager (the UE 910) may average the SL-measurement reports received from at least one of the UEs in the SL-Group obtained during a period of time). In some of the present implementations, the local manager may set default values (e.g., default SL-TxParameters) to other UEs through dedicated control signaling (e.g., during the SL-measurement negotiation through PC5 RRC signaling delivery). The default values, in some of such implementations, may be received from the serving base station, or may be part of the pre-configuration installed at the local manager.

Then, in action 955, the UE 920 may report its own SL-measurement (e.g., a second SL-measurement report) after the UE 920 has available SL-measurement results. Similarly, in action 960, the UE 930 may report its own SL-measurement (e.g., a third SL-measurement report) after the UE 930 has available SL-measurement results. In some of the present implementations, as described above, the UE 910 may request (e.g., through dedicated signaling, such as PC5 RRC signaling) from a new member (e.g., the UE 920) to provide the SL-measurement report. In some of the present implementations, the UEs in the SL-Group may provide the SL-measurement reports (such as the second report in action 955) to the local manager periodically (the periodicity may be indicated by the local manager through dedicated signaling, a default value configured by serving RAN, a pre-defined value in technical specification, or may be a fixed value decided by pre-configuration) or aperiodically. In some of the present implementations, the UEs in the SL-Group may provide a one-shot SL-measurement report to the local manager. In some of the present implementations, both of the periodical reporting or one-shot reporting may be triggered by specific events (e.g., the Event V1a/V2a), or by local manager's instruction.

In action 965, the local manager may trigger an SL-TxParameters adaptation after determining that the second and third SL-measurement reports from the UEs 920 and 930, respectively, in the SL-Group are received, or the UE 910 may trigger the SL-TxParameters adaptation based on its own SL-measurement results, or a combination of the received reports and its own measurement results. After adjusting the transmission parameters for the sidelink group in action 965, the UE 910 may transmit an SL-congestion control message (e.g., through unicasting or group-casting in (LTE/NR) PC5 interface) to the UEs 920 and 930 in the SL-Group in actions 970 and 975, respectively, to instruct the UEs in the SL-Group to adapt their SL-TxParameters. Thereafter, in action 980, an SL-congestion control for the SL-Group may be achieved by (at least one of) the UEs in the SL-Group (including the UEs 910, 920, and 930) modifying their SL-TxParameters based on the SL-congestion control message. That is, not only the members of a sidelink group (e.g., the UEs 920, 930) may adjust their SL-TxParameters based on the SL-congestion control message, the local manager (e.g., the UE 910) may also adjust its own SL-TxParameters based on the SL-congestion control message in some of the present implementations.

The local manager (the UE 910) may trigger the SL-TxParameters adaptation when (at least) one of the following triggering events is satisfied. When the CBR values of the UEs in the SL-Group are higher than a CBR threshold. The CBR threshold may be a predefined fixed value (e.g., specified by the technical specification or a dynamic value in between in some of the present implementations. In some other aspects of the present implementations, the CBR threshold may be decided by the local manager itself, by a serving base station, by pre-configuration installed at the local manager, or by receiving control signaling from other UEs through LTE/NR PC5 interface. In some of the present implementations, the serving base station may instruct the local manager (e.g., through broadcasting, group-casting or dedicated signaling) to trigger the SL-TxParameters adaptation. In some other aspects of the present implementations, A local manager of another SL-Group may provide an SL-Channel-Overload-indication to the UE 910 (e.g., through dedicated control signaling, such as PC5 RRC signaling).

In some of the present implementations, the UEs in an SL-Group may not provide SL-measurement reports to the local manager under certain circumstances. For example, when (some of) the UEs in the SL-Group are power-constrained, or when (some of) the UEs in the SL-Group are not capable of performing sidelink measurement (e.g., CBR), the UEs may not provide the SL-measurement reports to the local manager. In some of such implementations, the local manager may determine to transmit the SL-congestion control message based on some other (e.g., predefined) triggering event(s) (e.g., Event V1a or Event V2a) which is observed by the local manager itself. Then, the local manager may also deliver the adjusted SL-TxParameters to the member UEs in the SL-Group using the SL-congestion control messages for each UE respectively. It should also be noted that, in some implementations, the SL-congestion control message may be a multi-cast (or group-cast) message within the SL-group (in SL-groupcast manner in NR PC5 interface), and therefore, the action 970/975 may be implemented by one control signaling delivery through the PC5 interface. In some other implementations, the SL-congestion control message may be a unicast message (in SL-unicast manner in NR PC5 interface) and therefore, the local manager may deliver one SL-congestion control message to each UE, respectively, in actions 970 and 975.

Additionally, the above described reflective approach may also be applicable to the SL-Groups. For example, with reference to FIG. 9, the local manager (the UE 910) may not deliver the SL-congestion control message to the UEs 920 and 930 in some of the present implementations. Instead, in some of such implementations, the local manager may adjust its own SL-TxParameters directly during the sidelink packet delivery to the other UEs in the same SL-Group. As such, after receiving the SL-packets from the local manager, the other UEs in the SL-Group (e.g., the UEs 920 and 930) may adapt their own SL-TxParameters by referring to the SL-TxParameters that the UEs received from the local manager. In some other aspects of the present implementations, the local manager may transmit the adjusted SL-TxParamenters directly to (at least) one UE in the SL-group using an SL-groupcast approach, or an SL-unicast approach.

In some of the present implementations, different (NR/LTE) SL-resource pools associated with one SL-CC may be configured for different sidelink (Tx/Rx) beams in one Tx/Rx UE. In some of such implementations, a UE may measure and report the SL-measurements (e.g., the CBR or CR) of each specific beam (e.g., for an NR PC5 interface established between the UEs) separately.

Figure 10:
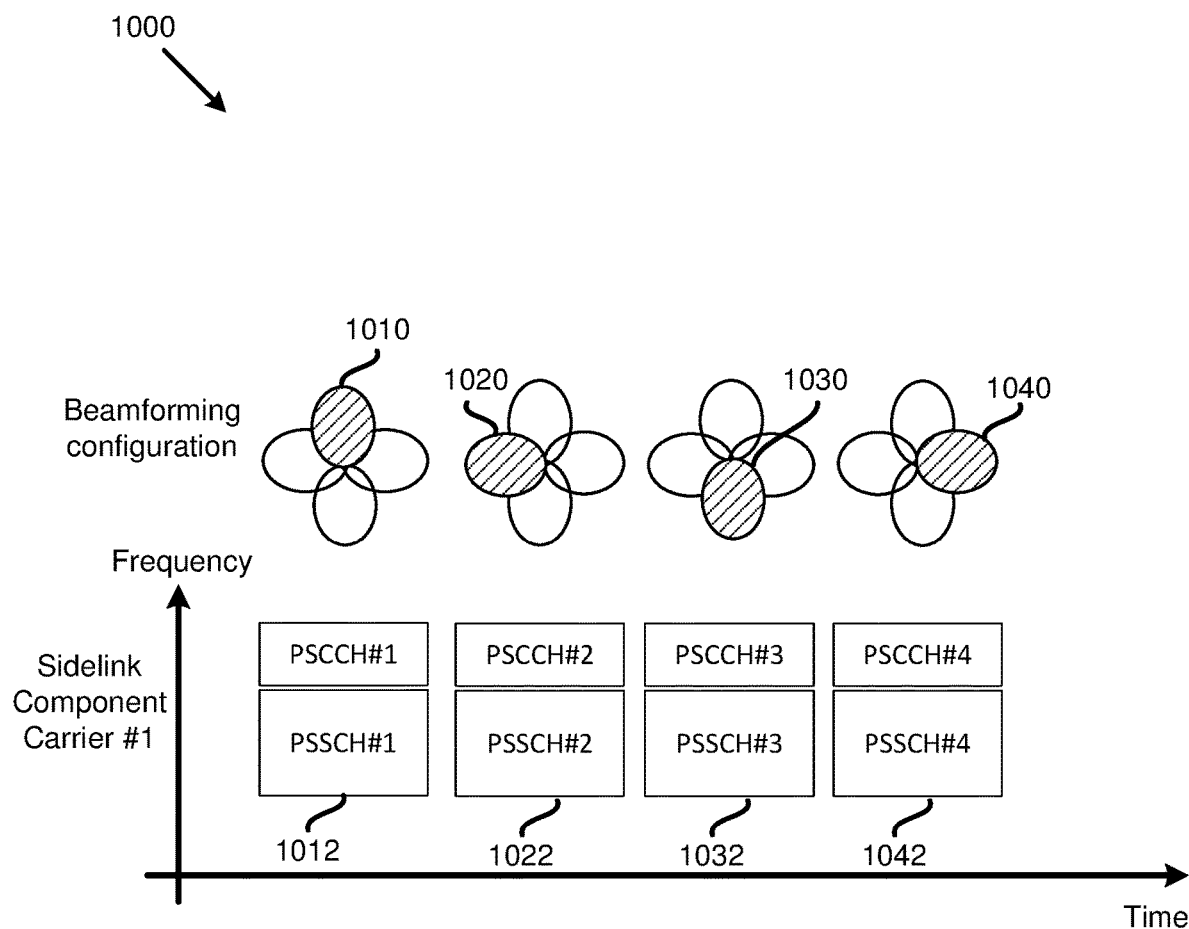
FIG. 10 is a diagram illustrating an SL-measurement configuration determined based on SL-resource pool configuration and beamforming configuration, according to one implementation of the present application.

FIG. 10 is a diagram 1000 illustrating an SL-measurement configuration determined based on SL-resource pool configuration and beamforming configuration, according to one implementation of the present application. As shown in FIG. 10, there may be four different sidelink beam directions 1010, 1020, 1030, and 1040 associated with a UE. In some of the present implementations, different SL-resource pools may be configured for different beams in one sidelink component carrier.

In some of the present implementations, a UE may monitor the first sidelink beam direction 1010, and then calculate the CBR of the beam direction 1010 (e.g., by monitoring the SL Pools associated with the beam direction 1010) after monitoring all of the (continuous) Physical channels (e.g., PSSCH(s) 1012) within a first time period. Similarly, in some of such implementations, the UE may also monitor and calculate the CBR for a different sidelink beam, such as the beam 1020, after monitoring all of the (continuous) physical channels (e.g., PSSCH(s) 1022) during a time period equal to the first time period. Similarly, the CBRs for the sidelink beams 1030 and 1040 may be calculated by monitoring, respectively, all of the continuous PSSCH(s) 1032 and 1042 within time periods equal to the first time period in some of the present implementations.

In some of the present implementations, the monitoring period (e.g., the first time period) may be a fixed value (e.g., 100 subframes, which is the same as the conventional CBR measurement, longer than 100 subframes, or shorter than 100 subframes). In some aspects of the present implementations, the monitoring period may be a configurable value decided by a serving base station, or by the pre-configuration stored at the UE. In some of the present implementations, the CBRs that need to be measured (and be reported) may be decided by the configuration of the serving base station, a UE (e.g., local manager), or the serving base station of the UE, or by the pre-configuration stored at the UE.

In some of the present implementations, in a unicast scenario, a UE may send a request to another UE to report the SL-measurement report (e.g., CBR(s)) of its specific beams(s) during the negotiation phase (e.g., during action 230 with reference to FIG. 2). In some other aspects of the present implementations, a UE may measure (and report to one or more other UEs) the CBR(s) for all of the UE's available beams based on pre-configuration stored at the UE. It should be noted that, the described beam-based SL-measurement may be reported (e.g., through PC5 RRC signaling) not only on the LTE/NR PC5 interface to other UEs, but also may be deliverable on the LTE/NR Uu interface for the serving RAN (e.g., through dedicated RRC signaling, such as RRCConnection(Re)Establishment message, RRCConnectionRelease message with/without suspend configuration, RRCConnectionReconfiguration message with/without mobilitycontrolinfoV2X, or RRCConnectionReconfiguration message with/without reconfigurationwithsync message), for example, to adjust the SL-resource pool configuration in some of the present implementations.

FIG. 11 is an example mapping table illustrating mapping of the monitored (or received) CBR values to the associated SL-TxParameters, according to one example implementation of the present application. As illustrated in FIG. 11, the SL-CBR range column 1110 includes different CBR ranges. Each CBR range may be defined with an upper bound and a lower bound. In addition, each CBR range (e.g., the first CBR range $0 \leq C_{SL} < T_{CBR\_a}$ in column 1110), in some of the present implementations, may be associated with any combination of:

A. SL-Tx Power Parameters (e.g., {P0_PSSCH,1, alphaPSSCH,1}) for sidelink Tx power adjustment included in SL-TX Power Parameters column 1120. It should also be noted that different SL-Tx Power Parameters for other physical channels (e.g., PSCCH, PSFCH, PSBCH, sidelink Synchronization Set Burst, etc.) may also be configured to be associated with different CBR ranges.

B. SL-range of the maximum number of retransmissions per sidelink Transport Block (TB) included in SL-Range of the Number of Retransmissions column 1130 (e.g., 4 times retransmission per TB).

C. SL-Modulation and Coding Scheme (e.g., a set of MCS-Index $MCS_{SL\_\#}1 \sim MCS_{SL\_\#}5$ are configured) included in SL-Modulation and Coding Scheme column 1140. Each Index may be predefined with one MCS mapping table (e.g., predefined in the technical specification) to be associated with one modulation coding approach and/or channel coding rate. As such, after receiving the MCS-Index, the UE may determine the allowed modulation coding approach(es) and channel coding rate(s) based on the mapping table of the MCS-index and the predefined MCS mapping table).

D. SL-maximum limit on CR (channel occupancy) ratio (e.g., $CR_{SL,1}$) included in SL-Maximum Limit on CR Ratio column 1150. Therefore, the UE may stop accessing an (or a set of) SL Pool(s) if the channel occupancy ratio (or CBR) to the target SL Pool is higher than the configured SL-maximum limit on the CR ratio.

Figure 12:
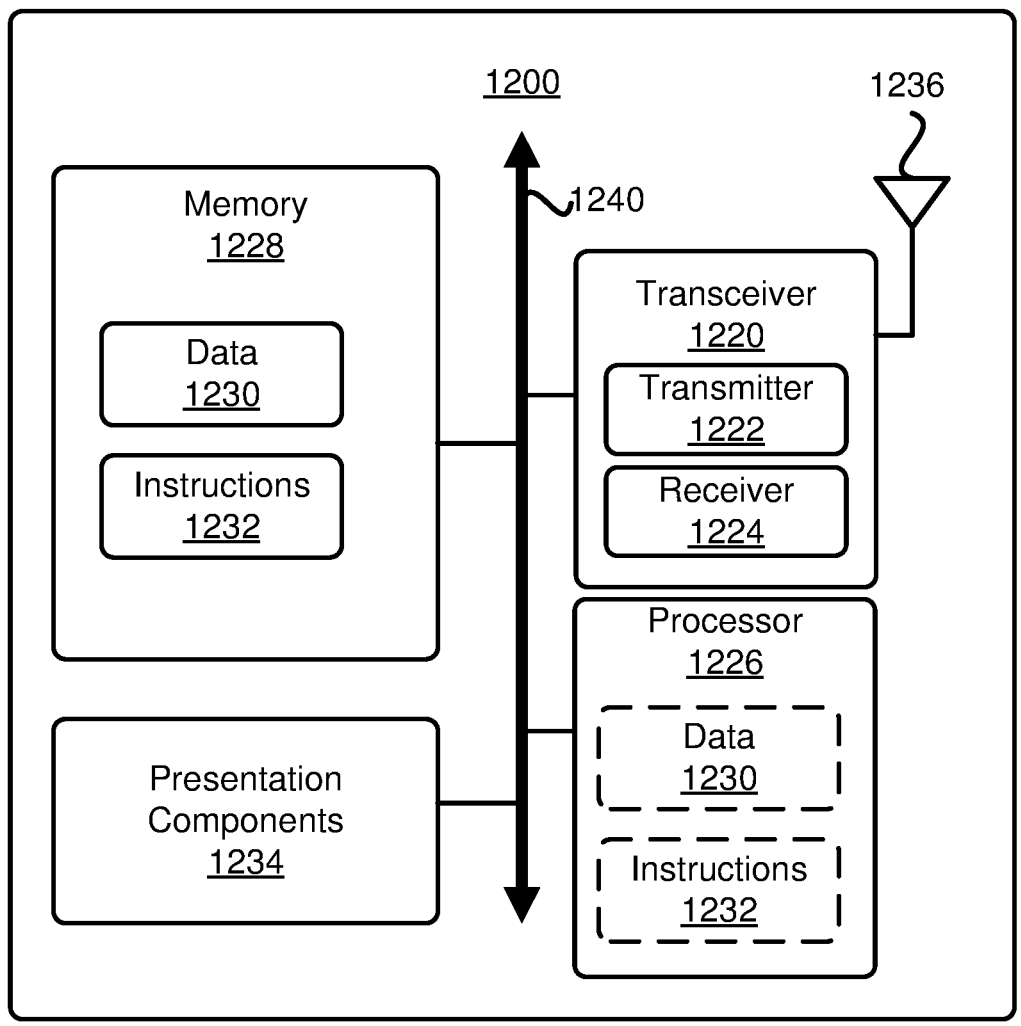
FIG. 12 illustrates a block diagram of a node for wireless communication, according to one example implementation of the present application.

FIG. 12 illustrates a block diagram of a node for wireless communication, according to one example implementation of the present application. As shown in FIG. 12, node 1200 may include transceiver 1220, processor 1226, memory 1228, one or more presentation components 1234, and at least one antenna 1236. Node 1200 may also include a Radio Frequency (RF) spectrum band module, a base station communications module, a network communications module, and a system communications management module, input/output (I/O) ports, I/O components, and power supply (not explicitly shown in FIG. 12). Each of these components may be in communication with each other, directly or indirectly, over one or more buses 1240.

Transceiver 1220 having transmitter 1222 and receiver 1224 may be configured to transmit and/or receive time and/or frequency resource partitioning information. In some implementations, transceiver 1220 may be configured to transmit in different types of subframes and slots including, but not limited to, usable, non-usable and flexibly usable subframes and slot formats. Transceiver 1220 may be configured to receive data and control signalings.

Node 1200 may include a variety of computer-readable media. Computer-readable media can be any available media that can be accessed by node 1200 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1228 may include computer-storage media in the form of volatile and/or non-volatile memory. Memory 1228 may be removable, non-removable, or a combination thereof. Exemplary memory includes solid-state memory, hard drives, optical-disc drives, and etc. As illustrated in FIG. 12, memory 1228 may store computer-readable, computer-executable instructions 1232 (e.g., software codes) that are configured to, when executed, cause processor 1226 to perform various functions described herein, for example, with reference to FIGS. 1 through 12. Alternatively, instructions 1232 may not be directly executable by processor 1226 but be configured to cause node 1200 (e.g., when compiled and executed) to perform various functions described herein.

Processor 1226 may include an intelligent hardware device, for example, a central processing unit (CPU), a microcontroller, an ASIC, and etc. Processor 1226 may include memory. Processor 1226 may process data 1230 and instructions 1232 received from memory 1228, and information through transceiver 1220, the base band communications module, and/or the network communications module. Processor 1226 may also process information to be sent to transceiver 1220 for transmission through antenna 1236, to the network communications module for transmission to a core network.

One or more presentation components 1234 presents data indications to a person or other device. For example, one or more presentation components 1234 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) to deliver a sidelink channel busy ratio (CBR) measurement report to a serving cell, the method comprising:
   receiving, by the UE, from the serving cell, inter-radio access technology (inter-RAT) sidelink CBR measurement configuration associated with sidelink communication on a PC5 interface;
   generating an inter-RAT sidelink CBR measurement report by monitoring at least one target resource pool allocated to the UE based on the received inter-RAT sidelink CBR measurement configuration; and
   transmitting the inter-RAT sidelink CBR measurement report to the serving cell.

2. The method of claim 1, further comprising:
   transmitting the inter-RAT sidelink CBR measurement report to a second UE through PC5 Radio Resource Control (RRC) signaling specific to the second UE.

3. The method of claim 2, wherein transmitting the inter-RAT sidelink CBR measurement report to the second UE comprises transmitting the inter-RAT sidelink CBR measurement report for the second UE to adjust one or more sidelink transmission parameters of the second UE based on the inter-RAT sidelink CBR measurement report.

4. The method of claim 2, further comprising:
   receiving, by the UE, a second sidelink CBR measurement configuration associated with the second UE, from the serving cell; and
   generating the sidelink CBR measurement report by monitoring at least one target resource pool allocated to the UE based on the received second sidelink CBR measurement configuration from the serving cell,
   wherein transmitting the inter-RAT sidelink CBR measurement report to the second UE comprises transmitting the inter-RAT sidelink CBR measurement report to the second UE based on the second sidelink CBR measurement configuration.

5. The method of claim 4, further comprising:
   receiving, by the UE, a new radio (NR) sidelink CBR measurement configuration, associated with the second UE, from an NR serving cell;
   generating an NR sidelink CBR measurement report by monitoring at least one target resource pool allocated for NR sidelink communication based on the received NR sidelink CBR measurement configuration from the NR serving cell; and
   transmitting, by the UE, the NR sidelink CBR measurement report to the second UE through NR PC5 Radio Resource Control (RRC) signaling.

6. The method of claim 4, further comprising:
   receiving, by the UE, a new radio (NR) sidelink CBR measurement configuration, associated with the second UE, from an evolved universal terrestrial radio access (E-UTRA) serving cell;
   generating an NR sidelink CBR measurement report by monitoring at least one target resource pool allocated for NR sidelink communication based on the received NR sidelink CBR measurement configuration from the E-UTRA serving cell; and
   transmitting, by the UE, the NR sidelink CBR measurement report to the second UE through NR PC5 Radio Resource Control (RRC) signaling.

7. The method of claim 1, further comprising:
   before transmitting the inter-RAT sidelink CBR measurement report, receiving a triggering event that indicates to the UE to transmit the inter-RAT sidelink CBR measurement report to the serving cell, the triggering event comprising at least one of:
   the serving cell requesting the inter-RAT sidelink CBR measurement report;
   a CBR measurement result that is one of higher than a first threshold and lower than a second threshold; and
   a predefined time interval lapsing.

8. The method of claim 1, wherein the inter-RAT sidelink CBR measurement report is a first sidelink measurement report, the method further comprising:
   receiving, from a second UE, a second sidelink CBR measurement report; and
   adjusting sidelink transmission parameters of the UE based on the second sidelink CBR measurement report.

9. The method of claim 1, wherein:
   the inter-RAT sidelink CBR measurement configuration comprises inter-RAT sidelink CBR measurement configuration associated with new radio (NR) sidelink communication;
   the serving cell comprises an evolved universal terrestrial radio access (E-UTRA) serving cell;
   receiving the inter-RAT sidelink CBR measurement configuration comprises receiving the inter-RAT sidelink CBR measurement configuration through E-UTRA Radio Resource Control (RRC) signaling; and
   transmitting the inter-RAT sidelink CBR measurement report comprises transmitting an NR sidelink CBR measurement report to the E-UTRA serving cell through the E-UTRA RRC signaling.

10. The method of claim 1, wherein:
the inter-RAT sidelink CBR measurement configuration comprises inter-RAT sidelink CBR measurement configuration associated with evolved universal terrestrial radio access (E-UTRA) vehicle to everything (V2X) sidelink communication;
the serving cell comprises a new radio (NR) serving cell;
receiving the inter-RAT sidelink CBR measurement configuration comprises receiving the inter-RAT sidelink CBR measurement configuration through NR Radio Resource Control (RRC) signaling; and
transmitting the inter-RAT sidelink CBR measurement report comprises transmitting an E-UTRA V2X sidelink CBR measurement report to the NR serving cell through the NR RRC signaling.

11. A user equipment (UE) comprising:
one or more non-transitory computer-readable media having computer-executable instructions for delivering a sidelink channel busy ratio (CBR) measurement report to a serving cell; and
at least one processor coupled to the one or more non-transitory computer-readable media, and configured to execute the computer-executable instructions to:
receive, by the UE, from the serving cell, inter-radio access technology (inter-RAT) sidelink CBR measurement configuration associated with sidelink communication on a PC5 interface;
generate an inter-RAT the sidelink CBR measurement report by monitoring at least one target resource pool allocated to the first UE based on the received inter-RAT sidelink CBR measurement configuration; and
transmit the sidelink CBR measurement report to the serving cell.

12. The UE of claim 11, wherein the at least one processor is further configured to execute the computer-executable instructions to:
transmit the inter-RAT sidelink CBR measurement report to a second UE through PC5 Radio Resource Control (RRC) signaling specific to the second UE.

13. The UE of claim 12, wherein transmitting the inter-RAT sidelink CBR measurement report to the second UE comprises transmitting the inter-RAT sidelink CBR measurement report for the second UE to adjust one or more sidelink transmission parameters of the second UE based on the inter-RAT sidelink CBR measurement report.

14. The UE of claim 12, wherein the at least one processor is further configured to execute the computer-executable instructions to:
receive, by the UE, a second sidelink CBR measurement configuration associated with the second UE, from the serving cell; and
generate the sidelink CBR measurement report by monitoring at least one target resource pool allocated to the UE based on the received second sidelink CBR measurement configuration from the serving cell,
wherein transmitting the inter-RAT sidelink CBR measurement report to the second UE comprises transmitting the inter-RAT sidelink CBR measurement report to the second UE based on the second sidelink CBR measurement configuration.

15. The UE of claim 14, wherein the at least one processor is further configured to execute the computer-executable instructions to:
receive, by the UE, a new radio (NR) sidelink CBR measurement configuration, associated with the second UE, from an NR serving cell;
generate an NR sidelink CBR measurement report by monitoring at least one target resource pool allocated for NR sidelink communication based on the received NR sidelink CBR measurement configuration from the NR serving cell; and
transmit, by the UE, the NR sidelink CBR measurement report to the second UE through NR PC5 Radio Resource Control (RRC) signaling.

16. The UE of claim 14, wherein the at least one processor is further configured to execute the computer-executable instructions to:
receive, by the UE, a new radio (NR) sidelink CBR measurement configuration, associated with the second UE, from an evolved universal terrestrial radio access (E-UTRA) serving cell;
generate an NR sidelink CBR measurement report by monitoring at least one target resource pool allocated for NR sidelink communication based on the received NR sidelink CBR measurement configuration from the E-UTRA serving cell; and
transmit, by the UE, the NR sidelink CBR measurement report to the second UE through NR PC5 Radio Resource Control (RRC) signaling.

17. The UE of claim 11, wherein the at least one processor is further configured to execute the computer-executable instructions to:
before transmitting the inter-RAT sidelink CBR measurement report, receive a triggering event that indicates to the UE to transmit the inter-RAT sidelink CBR measurement report to the serving cell, the triggering event comprising at least one of:
the serving cell requesting the inter-RAT sidelink CBR measurement report;
a CBR measurement result that is one of higher than a first threshold and lower than a second threshold; and
a predefined time interval lapsing.

18. The UE of claim 11, wherein the inter-RAT sidelink CBR measurement report is a first sidelink measurement report, wherein the at least one processor is further configured to execute the computer-executable instructions to:
receive, from a second UE, a second sidelink CBR measurement report; and
adjust sidelink transmission parameters of the UE based on the second sidelink CBR measurement report.

19. The UE of claim 11, wherein:
the inter-RAT sidelink CBR measurement configuration comprises inter-RAT sidelink CBR measurement configuration associated with new radio (NR) sidelink communication;
the serving cell comprises an evolved universal terrestrial radio access (E-UTRA) serving cell;
receiving the inter-RAT sidelink CBR measurement configuration comprises receiving the inter-RAT sidelink CBR measurement configuration through E-UTRA Radio Resource Control (RRC) signaling; and
transmitting the inter-RAT sidelink CBR measurement report comprises transmitting an NR sidelink CBR measurement report to the E-UTRA serving cell through the E-UTRA RRC signaling.

20. The UE of claim 11, wherein:
the inter-RAT sidelink CBR measurement configuration comprises inter-RAT sidelink CBR measurement configuration associated with evolved universal terrestrial radio access (E-UTRA) vehicle to everything (V2X) sidelink communication;
the serving cell comprises a new radio (NR) serving cell;
receiving the inter-RAT sidelink CBR measurement configuration comprises receiving the inter-RAT sidelink CBR measurement configuration through NR Radio Resource Control (RRC) signaling; and transmitting the inter-RAT sidelink CBR measurement report comprises transmitting an E-UTRA V2X sidelink CBR measurement report to the NR serving cell through the NR RRC signaling.

\* \* \* \* \*